US012659855B2

(12) United States Patent 
Shih et al.

(10) Patent No.: US 12,659,855 B2 
(45) Date of Patent: Jun. 16, 2026

(54) METHOD OF PERFORMING A POWER SAVING OPERATION AND RELATED DEVICE

(71) Applicant: SHARP KABUSHIKI KAISHA, Sakai City (JP)

(72) Inventors: Mei-Ju Shih, Taipei (TW); Hsin-Hsi Tsai, Taipei (TW); Hung-Chen Chen, Taipei (TW)

(73) Assignee: SHARP KABUSHIKI KAISHA, Sakai City (JP)

( * ) Notice: Subject to any disclaimer, the term of this patent is extended or adjusted under 35 U.S.C. 154(b) by 362 days.

(21) Appl. No.: 17/927,114

(22) PCT Filed: May 25, 2021

(86) PCT No.: PCT/CN2021/095819

§ 371 (c)(1), 
(2) Date: Nov. 22, 2022

(87) PCT Pub. No.: WO2021/238921

PCT Pub. Date: Dec. 2, 2021

(65) Prior Publication Data

US 2023/0209463 A1 Jun. 29, 2023

Related U.S. Application Data

(60) Provisional application No. 63/030,204, filed on May 26, 2020, provisional application No. 63/030,216, filed on May 26, 2020.

(51) Int. Cl. 
*H04W 52/02* (2009.01) 
*H04W 76/27* (2018.01) 
*H04W 76/28* (2018.01)

(52) U.S. Cl. 
CPC ... *H04W 52/0216* (2013.01); *H04W 52/0229* (2013.01); *H04W 76/27* (2018.02); *H04W 76/28* (2018.02)

(58) Field of Classification Search 
None 
See application file for complete search history.

(56) References Cited

U.S. PATENT DOCUMENTS

2012/0069782 A1* 3/2012 Kuo ...................... H04W 76/28 
370/311 
2015/0098406 A1 4/2015 Miao et al. 
(Continued)

FOREIGN PATENT DOCUMENTS

CN 107360562 A 11/2017 
CN 108966322 A 12/2018 
(Continued)

OTHER PUBLICATIONS

3GPP TS 38.304, "3rd Generation Partnership Project; Technical Specification Group Radio Access Network; NR; User Equipment (UE) procedures in Idle mode and RRC Inactive state (Release 16)", V16.0.0 (Mar. 2020). 
(Continued)

*Primary Examiner* — Jamaal Henson 
(74) *Attorney, Agent, or Firm* — ScienBiziP, P.C.

(57) ABSTRACT

A method of performing a power saving operation for a user equipment (UE) is provided. The method includes receiving, from a base station (BS), a plurality of power saving configurations, while the UE is in a radio resource control (RRC) idle state or an RRC inactive state, selecting one of the plurality of power saving configurations according to a rule predefined in the UE or a first indication received from the BS, and applying the selected one of the plurality of power saving configurations for the power saving operation.

20 Claims, 6 Drawing Sheets

(56) References Cited

U.S. PATENT DOCUMENTS

| | | | |
|---|---|---|---|
| 2017/0048772 A1* | 2/2017 | Gheorghiu | ........... H04L 5/0007 |
| 2017/0325283 A1 | 11/2017 | Wu | |
| 2018/0213452 A1 | 7/2018 | Kim et al. | |
| 2020/0205076 A1 | 6/2020 | Chen et al. | |
| 2021/0297954 A1* | 9/2021 | He | ........................ H04W 72/23 |
| 2021/0352588 A1* | 11/2021 | Liu | ................... H04W 52/0216 |
| 2021/0410107 A1* | 12/2021 | Park | ...................... H04W 68/02 |
| 2022/0007289 A1* | 1/2022 | Seo | ...................... H04W 76/28 |
| 2022/0015034 A1* | 1/2022 | Miao | .................... H04W 72/23 |

FOREIGN PATENT DOCUMENTS

| | | | | |
|---|---|---|---|---|
| CN | 110178335 A | 8/2019 | | |
| GB | 2500260 A * | 9/2013 | ........ | H04W 36/0088 |
| WO | 2020051547 A1 | 3/2020 | | |

OTHER PUBLICATIONS

3GPP TS 38.321, "3rd Generation Partnership Project; Technical Specification Group Radio Access Network; NR; Medium Access Control (MAC) protocol specification (Release 16)", V16.0.0 (Mar. 2020).

* cited by examiner

400

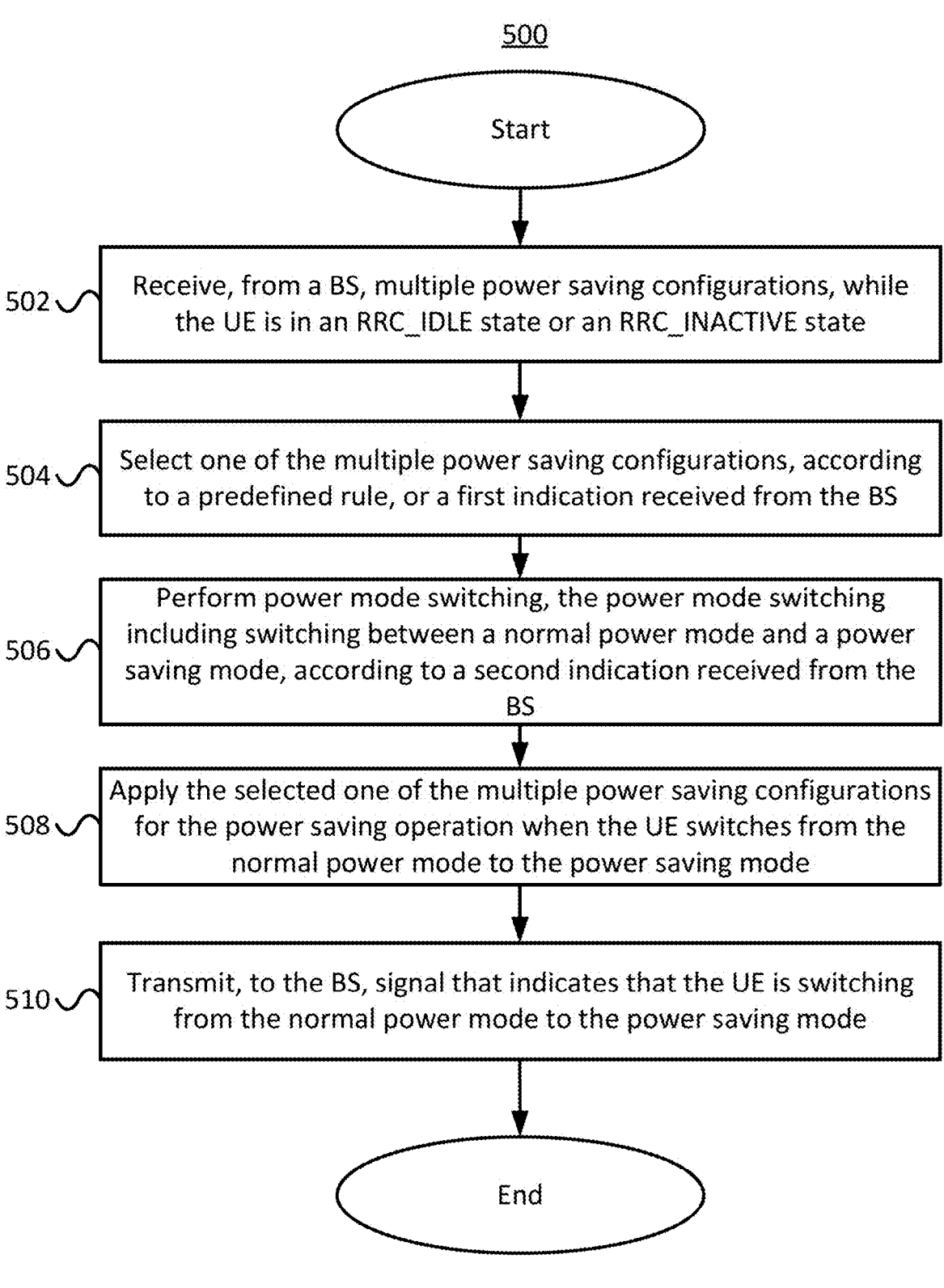

500

Start

502  Receive, from a BS, multiple power saving configurations, while the UE is in an RRC_IDLE state or an RRC_INACTIVE state 504  Select one of the multiple power saving configurations, according to a predefined rule, or a first indication received from the BS 506  Perform power mode switching, the power mode switching including switching between a normal power mode and a power saving mode, according to a second indication received from the BS 508  Apply the selected one of the multiple power saving configurations for the power saving operation when the UE switches from the normal power mode to the power saving mode 510  Transmit, to the BS, signal that indicates that the UE is switching from the normal power mode to the power saving mode End

FIG.5

METHOD OF PERFORMING A POWER SAVING OPERATION AND RELATED DEVICE

CROSS-REFERENCE TO RELATED APPLICATION(S)

The present disclosure is a National Stage Application of International Patent Application Serial No. PCT/CN2021/095819, filed on May 25, 2021, which claims the benefit of and priority to U.S. Provisional Patent Application Ser. No. 63/030,216, filed on May 26, 2020, and U.S. Provisional Patent Application Ser. No. 63/030,204, filed on May 26, 2020. The contents of all of the above-mentioned applications are hereby incorporated fully by reference into the present disclosure.

FIELD

The present disclosure is generally related to wireless communications and, more specifically, to a method of performing a power saving operation and a related device.

BACKGROUND

With the tremendous growth in the number of connected devices and the rapid increase in user/network traffic volume, various efforts have been made to improve different aspects of wireless communication for the next-generation wireless communication system, such as fifth-generation (5G) New Radio (NR), by improving data rate, latency, reliability, and mobility.

The 5G NR system is designed to provide flexibility and configurability for optimizing the network services and types and accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure provides a method of performing a power saving operation and a related device. According to an aspect of the present disclosure, a method of performing a power saving operation for a user equipment (UE) is provided. The method includes receiving, from a base station (BS), a plurality of power saving configurations, while the UE is in a radio resource control (RRC) idle state or an RRC inactive state, selecting one of the plurality of power saving configurations according to a rule predefined in the UE or a first indication received from the BS, and applying the selected one of the power saving configurations for the power saving operation.

According to another aspect of the present disclosure, a UE for performing a power saving operation is provided. The UE includes at least one processor and at least one memory coupled to the at least one processor and storing computer-executable instructions that, when executed by the at least one processor, cause the UE to perform the method.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

FIG. 5 is a flowchart illustrating a method/process for a UE to perform a power saving operation, according to an example implementation of the present disclosure.

DESCRIPTION

Figure 1:
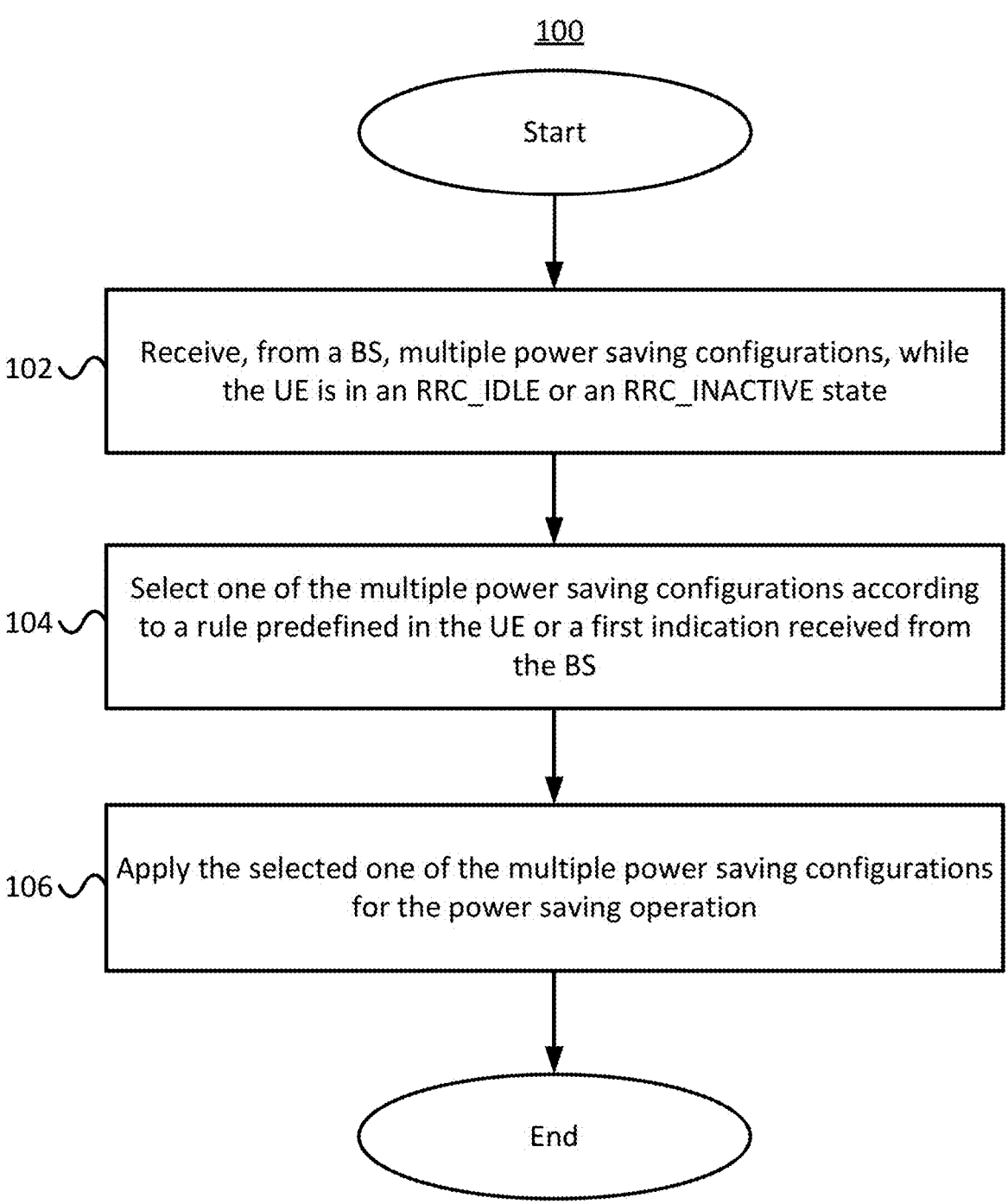
FIG. 1 is a flowchart illustrating a method/process for a UE to perform a power saving operation, according to an implementation of the present disclosure.

The following disclosure contains specific information pertaining to exemplary implementations in the present disclosure. The drawings and their accompanying detailed disclosure are directed to exemplary implementations. However, the present disclosure is not limited to these exemplary implementations. Other variations and implementations of the present disclosure will occur to those skilled in the art. Unless noted otherwise, like or corresponding elements in the drawings may be indicated by like or corresponding reference numerals. Moreover, the drawings and illustrations are generally not to scale and are not intended to correspond to actual relative dimensions.

For consistency and ease of understanding, like features are identified (although, in some examples, not shown) by reference designators in the exemplary drawings. However, the features in different implementations may be different in other respects, and therefore shall not be narrowly confined to what is shown in the drawings.

The phrases "in one implementation," and "in some implementations," may each refer to one or more of the same or different implementations. The term "coupled" is defined as connected, whether directly or indirectly via intervening components, and is not necessarily limited to physical connections. The term "comprising" may mean "including, but not necessarily limited to" and specifically indicate open-ended inclusion or membership in the disclosed combination, group, series, and equivalents.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists. Besides, the character "/" used herein generally represents that the former and latter associated objects are in an "or" relationship.

Additionally, any two or more of the following paragraphs, (sub)-bullets, points, actions, behaviors, terms, alternatives, examples, or claims in the present disclosure may be combined logically, reasonably, and properly to form a specific method. Any sentence, paragraph, (sub)-bullet, point, action, behaviors, terms, or claims in the present disclosure may be implemented independently and separately to form a specific method. Dependency, e.g., "based on", "more specifically", "preferably", "in one embodiment", "in one implementation", "in one alternative", in the present disclosure may refer to just one possible example that would not restrict the specific method.

For a non-limiting explanation, specific details, such as functional entities, techniques, protocols, standards, and the like, are set forth for providing an understanding of the disclosed technology. In other examples, detailed disclosure of well-known methods, technologies, systems, and architectures are omitted so as not to obscure the present disclosure with unnecessary details.

Persons skilled in the art will recognize that any disclosed network function(s) or algorithm(s) may be implemented by hardware, software, or a combination of software and hardware. Disclosed functions may correspond to modules that may be software, hardware, firmware, or any combination thereof. The software implementation may include computer-executable instructions stored on a computer-readable medium, such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Application-Specific Integrated Circuits (ASICs), programmable logic arrays, and/or one or more Digital Signal Processors (DSPs). Although some of the disclosed implementations are directed to software installed and executing on computer hardware, nevertheless, alternative implementations as firmware, as hardware, or as a combination of hardware and software are well within the scope of the present disclosure.

The computer-readable medium may include but may not be limited to Random Access Memory (RAM), Read-Only Memory (ROM), Erasable Programmable Read-Only Memory (EPROM), Electrically Erasable Programmable Read-Only Memory (EEPROM), flash memory, Compact Disc (CD) Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, an LTE-Advanced Pro system, or a New Radio (NR) system) may typically include at least one base station (BS), at least one UE, and one or more optional network elements that provide connection with a network. The UE may communicate with the network (e.g., a Core Network (CN), an Evolved Packet Core (EPC) network, an Evolved Universal Terrestrial Radio Access Network (E-UTRAN), a Next-Generation Core (NGC), a 5G Core (5GC), or an internet) via a Radio Access Network (RAN) established by one or more BSs.

A UE according to the present disclosure may include, but is not limited to, a mobile station, a mobile terminal or device, or a user communication radio terminal. For example, a UE may be a portable radio equipment that includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a node B (NB) as in the Universal Mobile Telecommunication System (UMTS), an evolved node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) RAN (GERAN), a next-generation eNB (ng-eNB) as in an Evolved Universal Terrestrial Radio Access (E-UTRA) BS in connection with the 5GC, a next-generation Node B (gNB) as in the 5G-RAN (or in the 5G Access Network (5G-AN)), and any other apparatus capable of controlling radio communication and managing radio resources within a cell. The BS may connect to serve the one or more UEs via a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GRPS), UMTS (often referred to as 3G) according to basic Wideband-Code Division Multiple Access (W-CDMA), High-Speed Packet Access (HSPA), LTE, LTE-A, enhanced LTE (eLTE), NR (often referred to as 5G), and/or LTE-A Pro. However, the scope of the present disclosure is not limited to these protocols.

The BS may be operable to provide radio coverage to a specific geographical area using a plurality of cells forming the RAN. The BS may support the operations of the cells. Each cell may be operable to provide services to at least one UE within its radio coverage. More specifically, each cell (often referred to as a serving cell) may provide services to serve one or more UEs within its radio coverage (e.g., each cell schedules the downlink (DL) and optionally UL resources to at least one UE within its radio coverage for DL and optionally UL packet transmissions). The BS may communicate with one or more UEs in the radio communication system via the plurality of cells.

A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be called a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As disclosed previously, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the 3rd Generation Partnership Project (3GPP), may serve as a baseline for an NR waveform. The scalable OFDM numerology, such as the adaptive subcarrier spacing, the channel bandwidth, and the cyclic prefix (CP), may also be used. Additionally, two coding schemes are applied for NR: (1) low-density parity-check (LDPC) code and (2) polar code. The coding scheme adaption may be configured based on the channel conditions and/or the service applications.

Moreover, in a transmission time interval of a single NR frame, at least DL transmission data, a guard period, and UL transmission data should be included. The respective portions of the DL transmission data, the guard period, and the UL transmission data should also be configurable, for example, based on the network dynamics of NR. An SL resource may also be provided via an NR frame to support ProSe services or V2X services.

A power saving mechanism (e.g., Discontinuous Reception (DRX) operation) is beneficial for power saving from the UE's perspective, especially for RRC_IDLE/RRC_I-NACTIVE UEs. Furthermore, due to the diversity of the UEs (e.g., different applications and distinguished traffic), a unified DRX operation with the same configuration (e.g., parameter/value) may not be efficient for all UEs in the network. In this disclosure, the dynamic control of a power saving mechanism (e.g., DRX operation) for UEs in the network may consider the following aspects: (1) the definition of a power saving configuration, (2) how the UE receives one or multiple power saving configuration(s), (3) the UE's behavior upon the reception of one or multiple power saving configuration(s), and (4) how UE-specific information may be applied for the determination of a power saving configuration and the transition of a power saving mode where the UE supports a power saving operation.

DRX Operation

DRX operation is one of the power saving mechanisms. For a UE in RRC_IDLE state, a UE-specific DRX operation may be configured by an upper layer (e.g., Non-Access Stratum (NAS) layer). For a UE in RRC_INACTIVE state, a UE-specific DRX operation may be configured by an upper layer (e.g., NAS layer and/or by Radio Resource Control (RRC) layer). For a UE in RRC_CONNECTED state, the UE may be configured with a UE-specific DRX operation by a lower layer (e.g., Medium Access Control (MAC) layer).

RRC_IDLE/RRC_INACTIVE UE

The UE may use DRX operation in RRC_IDLE state and RRC_INACTIVE state in order to reduce power consumption. The UE may monitor one paging occasion (PO) per DRX cycle. A PO is a set of Physical Downlink Control Channel (PDCCH) monitoring occasions and may include multiple time slots (e.g., subframe or OFDM symbol) where a paging Downlink Control Information (DCI) is sent by a serving/camped cell to the UE. One Paging Frame (PF) is one Radio Frame and may include one or multiple PO(s) or starting point of a PO.

UEs in RRC_IDLE state or RRC_INACTIVE state may monitor a System Information (SI) change indication in its own PO in every DRX cycle.

Earthquake & Tsunami Warning System (ETWS)-capable UEs in RRC_IDLE state or RRC_INACTIVE state, Commercial Mobile Alert System (CMAS)-capable UEs in RRC_IDLE state or RRC_INACTIVE state, or ETWS and CMAS-capable UEs in RRC_IDLE state or RRC_INAC-TIVE state may monitor indications about Public Warning System (PWS) notification in its own PO in every DRX cycle.

The UE in RRC_IDLE/RRC_INACTIVE state is operated in the power saving mode in several situations including (1) when the UE does not monitor a PO during a DRX cycle, and/or (2) when the UE does not monitor PDCCH monitoring occasion(s) for paging during a DRX cycle, and/or (3) when the UE does not transmit data and/or control information (e.g., RRC message, Acknowledgement/Non-Acknowledgement (ACK/NACK), DCI, Uplink Control Information (UCI), MAC Control Element (CE)) during a DRX cycle, and/or (4) when the UE does not monitor an SI change indication in its own PO during a DRX cycle, and/or (5) when the ETWS and/or CMAS-capable UE does not monitor an indication about PWS notification in its own PO during a DRX cycle, and/or (6) when the UE (only) monitors a PO during a DRX cycle, and/or (7) when the UE (only) monitors PDCCH monitoring occasion(s) for paging during a DRX cycle, and/or (8) when the UE (only) transmits data and/or control information during a DRX cycle, and/or (9) when the UE (only) monitors an SI change indication in its own PO during a DRX cycle, and/or (10) when the ETWS and/or CMAS capable-UE (only) monitors an indication about PWS notification in its own PO during a DRX cycle.

RRC_CONNECTED UE

UEs in RRC_CONNECTED state may monitor an SI change indication in any PO at least once per modification period if the UE is provided with common search space on the active bandwidth part (BWP) to monitor paging.

ETWS and/or CMAS capable UEs in RRC_CON-NECTED state may monitor for an indication about PWS notification in any PO at least once every default paging cycle (e.g., the length of the default paging cycle is indicated by the parameter defaultPagingCycle) if the UE is provided with common search space on the active BWP to monitor paging.

The MAC entity of the UE may be configured by the RRC layer of the UE with a DRX functionality that controls the UEs PDCCH monitoring activity for the MAC entitys Cell Radio Network Temporary Identity (C-RNTI), Configured Scheduling RNTI (CS-RNTI), Interruption RNTI (INT-RNTI), Slot Format Indication RNTI (SFI-RNTI), Semi-Persistent CSI RNTI (SP-CSI-RNTI), Transmit Power Control-Physical Uplink Control Channel-RNTI (TPC-PUCCH-RNTI), Transmit Power Control-Physical Uplink Shared Channel-RNTI (TPC-PUSCH-RNTI), and Transmit Power Control-Sounding Reference Symbols-RNTI (TPC-SRS-RNTI). When the DRX operation is configured, the MAC entity of the UE may monitor a PDCCH according to the requirements. When the UE is in RRC_CONNECTED state, if the DRX operation is configured for all the activated serving cells, the MAC entity of the UE may monitor a PDCCH discontinuously with the DRX operation. The UE is in the power saving operation (or called power saving mode) when the UE does not monitor a PDCCH with the DRX operation. It is possible that the UE may be in the power saving operation (or called power saving mode) when the UE (only) monitors a PDCCH with the DRX operation.

The RRC_CONNECTED UE may receive a RRC message (e.g., RRC Reconfiguration) including a DRX configuration (e.g., DRX-Config IE) to operate RRC connection control functions. The RRC connection control function may include the radio configuration control. The radio configuration control may include a DRX configuration for the UE to operate in a (long or short) DRX operation.

Power Saving Configuration

For the power saving purpose (but not limited thereto), a serving cell (or gNB) may configure the UE (in RRC_IDLE state, RRC_INACTIVE state, or RRC_CONNECTED state) with at least one power saving configuration.

The serving cell (or gNB) may configure the UE with multiple power saving configurations. For example, the UE may be configured with a first power saving configuration and a second power saving configuration. The parameters in the first power saving configuration may be the same as or different from the parameters in the second power saving configuration. If a first parameter in the first power saving configuration is the same as a second parameter in the second power saving configuration, the value of the first parameter in the first power saving configuration may be the same as or different from the value of the second parameter in the second power saving configuration. More specifically, different power saving configurations (or parameters) may be applied when the UE is in different RRC states. For example, the first power saving configuration (or parameter) may be applied when the UE is in RRC_CONNECTED state, and the second power saving configuration (or parameter) may be applied when the UE is in RRC_IDLE/ RRC_INACTIVE state.

The serving cell (or gNB) may configure the UE with one power saving configuration.

The UE may indicate whether it supports the capability of multiple power saving configurations (e.g., upon receiving a UE Capability Enquiry from the NW or via transmitting UE Assistance Information to the NW) to a network (NW). Alternatively, the UE may indicate whether it supports a specific power saving configuration used in RRC_CON-NECTED/RRC_INACTIVE/RRC_IDLE state (e.g., upon receiving a UE Capability Enquiry from the NW or via transmitting UE Assistance Information to the NW) to the NW.

For example, a UE in the power saving mode may indicate to the NW whether it supports the multiple power saving configurations (e.g., ENUMERATED {support}) via an RRC message (e.g., UE Assistance Information, UE Capability Information). For example, the UE in the power saving mode may indicate to the NW whether it supports the multiple power saving configurations via UE Capability message or RRC messages (e.g., RRC (Connection) Setup Complete message in an RRC (Connection) Setup procedure, RRC (Connection) Resume Complete message in an RRC (Connection) Resume procedure, RRC (Connection) Reestablishment Complete message in an RRC (Connection) Re-establishment procedure). If the UE in the power saving mode does not indicate so to the NW, the UE may not support multiple power saving configurations or may not activate the support of multiple power saving configurations.

Each power saving configuration may include a set of parameters for the UE to apply, so that the UE (or the NW) may operate in a power saving manner. The set of parameters in the power saving configuration may include DRX configuration (e.g., DRX-Config Information Element (IE)), paging related configuration (e.g., PCCH-Config IE), PDCCH monitoring related configuration (e.g., PDCCH-ConfigCommon IE), and any parameters required to configure the UE to operate in the power saving mode.

In detail, the DRX configuration may include (but is not limited to) DRX on duration timer (e.g., drx-onDuration-Timer IE), DRX inactivity timer (e.g., drx-Inactivity Timer IE), DRX Hybrid Automatic Repeat reQuest (HARQ) Round-Trip Time (RTT) DL timer (e.g., drx-HARQ-RTT-TimerDL IE), DRX HARQ RTT UL timer (e.g., drx-HARQ-RTT-TimerUL IE), DRX DL retransmission timer (e.g., drx-RetransmissionTimerDL IE), DRX UL retransmission timer (e.g., drx-RetransmissionTimerUL IE), DRX long cycle start offset (e.g., drx-LongCycleStartOffset IE), DRX short cycle (e.g., drx-ShortCycle IE), DRX short cycle timer (e.g., drx-ShortCycleTimer IE), DRX slot offset (e.g., drx-SlotOffset IE).

The paging related configuration may include (but is not limited to) paging cycle (e.g., DRX cycle, defaultPaging-Cycle IE, ran-PagingCycle IE, PagingCycle IE), first PDCCH monitoring occasion for paging of each PO of the PF (e.g., firstPDCCH-MonitoringOccasionOfPO IE), an offset used by the UE to derive the number of total paging frames in the paging cycle (corresponding to parameter 'N' used in PF/PO formula in the 3GPP TS 38.304 v16.0.0) and paging frame offset (corresponding to parameter PF_offset used in PF/PO formula in the 3GPP TS 38.304 v16.0.0) (e.g., nAndPagingFrameOffset IE), number of paging occasions per paging frame (e.g., ns IE), and the number of PDCCH monitoring occasions corresponding to an SSB for paging (e.g., nrofPDCCHMonitoringOccasionPerSSB IE).

The PDCCH related configuration may include (but is not limited to) Control Resource Set (CORESET), search space list, first PDCCH monitoring occasion of PO, and paging search space.

The UE may receive one or multiple power saving configurations. The serving cell (or gNB) may configure the UE in RRC_IDLE or RRC_INACTIVE state with multiple power saving configurations via dedicated signaling (e.g., RRC message) and/or via broadcast system information (e.g., SIB1, other SI). The UE in RRC_IDLE or RRC_I-NACTIVE state may receive the multiple power saving configurations in the same RRC message or different RRC messages. The UE in RRC_IDLE or RRC_INACTIVE state may receive the multiple power saving configurations in the same system information (e.g., one power saving configuration in a SIB #x (System Information Block Type x, x is a positive integer) and another power saving configuration in a SIB #x) or in different system information(s) (e.g., one power saving configuration in a SIB #x and another power saving configuration in a SIB #y (y is a positive integer)). The UE (e.g., RRC_IDLE UE, RRC_INACTIVE UE) may receive different power saving configuration(s) in the same or different RRC state(s). For example, the UE may receive the first power saving configuration when the UE is in RRC_CONNECTED state, and the UE may receive the second power saving configuration when the UE is in RRC_IDLE/RRC_INACTIVE state. Alternatively, the UE in RRC_IDLE or RRC_INACTIVE state may receive multiple power saving configurations via NAS message. The NW entity (e.g., Access and Mobility Management Function (AMF), Mobility Management Entity (MME)) in the core network (e.g., 5GC, EPC) may transmit the NAS message to the UE in RRC_IDLE or RRC_INACTIVE state via the BS (e.g., the UE's serving/camped cell). The BS may encapsulate the NAS message into an RRC message and transmit the RRC message including the NAS message to the UE in RRC_IDLE or RRC_INACTIVE state. The RRC layer of the UE may receive the RRC message from the BS and forward the NAS message in the RRC message to the NAS layer of the UE.

The previously mentioned RRC message that the UE receives from the serving cell (or gNB) may include:

1. RRC Reconfiguration message (including conditional configuration IE), e.g., when the UE is in RRC_CON-NECTED state.
2. RRC Release message without suspend configuration, e.g., when the UE is in RRC_CONNECTED or RRC_INACTIVE state.
3. RRC Release message with suspend configuration, e.g., when the UE is in RRC_INACTIVE state, after the UE transmits RRC (Connection) Resume Request message, or when the UE is in RRC_CONNECTED state. For example, the multiple power saving configurations may be included in the suspend configuration.
4. RRC (Connection) Setup message, e.g., when the UE is in RRC_IDLE state and/or after the UE transmits RRC (Connection) Setup Request message, when the UE is in RRC_CONNECTED state and/or after the UE transmits the RRC (Connection) Reestablishment Request message to the serving cell (or gNB), or when the UE is in RRC_INACTIVE state and/or after the UE transmits RRC (Connection) Resume Request message to the serving cell (gNB).

5. RRC (Connection) Resume message, e.g., when the UE is in RRC_INACTIVE state and/or after the UE transmits the RRC (Connection) Resume Request message to the serving cell (or gNB).

6. RRC (Connection) Reject message, e.g., when the UE is in RRC_IDLE state and/or after the UE transmits RRC (Connection) Setup Request message, or when the UE is in RRC_INACTIVE state and/or after the UE transmits RRC (Connection) Resume Request message to the serving cell (or gNB).

7. Paging message e.g., when the UE is in RRC_IDLE state, or when the UE is in RRC_INACTIVE state.

8. RRC (Connection) Reestablishment message, e.g., when the UE is in RRC_CONNECTED state and/or after the UE transmits RRC (Connection) Reestablishment Request message to the serving cell (or gNB).

9. Logged measurement configuration, e.g., when the UE is in RRC_IDLE state, when the UE is in RRC_INACTIVE state, or when the UE (capable of logged measurement) is in RRC_CONNECTED state. The UE capable of logged measurements may apply the power saving configuration for the logged measurement procedure.

10. Mobility From NR Command.

In one example, the UE may apply the power saving configuration in Mobility From NR Command for other RATs (e.g., E-UTRA). In another example, after the UE in RRC_CONNECTED state receives Mobility From NR Command from a serving cell (or gNB), the UE may apply the power saving configuration in Mobility From NR Command as the UE hands over to the other RATs that are indicated by the Mobility From NR Command.

11. UE Capability Enquiry, e.g., when the UE is in RRC_CONNECTED state.

The UE may receive the power saving configuration together with UE capability enquiry information elements in UE Capability Enquiry message.

12. UE Information Request, e.g., when the UE is in RRC_CONNECTED state or after the successful security activation.

When the UE receives one power saving configuration from the serving cell (or gNB) no matter via the broadcast/unicast system information or the dedicated RRC message, the UE applies the received power saving configuration.

In one example, if the UE has the stored power saving configuration, when the UE receives the one power saving configuration from the serving cell (or gNB), no matter via the broadcast/unicast system information or the dedicated RRC message, the UE may discard all the stored power saving configuration(s) and apply the newly received power saving configuration. Alternatively, the UE may discard all the stored power saving configuration(s) and apply the newly received power saving configuration only when the value tag or version number associated with the stored power saving configuration is different from the value tag or version number associated with the newly received power saving configuration (e.g., the value tag or version number associated with the stored power saving configuration is older (or less than) than the value tag or version number associated with the newly received power saving configuration).

In one example, if the UE has the stored power saving configuration, when the UE receives the one power saving configuration from the serving cell (or gNB), no matter via the broadcast/unicast system information or the dedicated RRC message, the UE may replace part of the stored power saving configuration with the newly received power saving configuration, and discard the replaced part of the stored power saving configuration. The UE may apply part of the newly received power saving configuration and part of the pre-stored power saving configuration that are not replaced with the newly received power saving configuration. The UE may discard/store part of the newly received power saving configuration that is not used for replacing part of the stored power saving configuration. Alternatively, if the value tag or version number associated with the stored power saving configuration is different from the value tag or version number associated with the newly received power saving configuration (e.g., the value tag or version number associated with the stored power saving configuration is older (or less than) than the value tag or version number associated with the newly received power saving configuration), the UE may replace this part of the stored power saving configuration with the newly received power saving configuration.

In one example, if the UE receives a UE-specific power saving configuration from the serving cell (or gNB) (e.g., via unicast system information, via the dedicated RRC message), the UE may apply the received UE-specific power saving configuration. Furthermore, if the UE has the stored power saving configuration, the UE may further replace (or discard) the stored power saving configuration with the received UE-specific power saving configuration. Alternatively, the UE may not replace (or discard) part of the power saving configuration if the UE does not receive such part of the power saving configuration, either via the broadcast/unicast system information or via the dedicated RRC message from the serving cell (or gNB). It is possible that the UE may receive part of the power saving configuration in delta signaling via the broadcast/unicast system information and/or via the dedicated RRC message from the serving cell (or gNB). If the UE does not receive a specific parameter in the power saving configuration, the UE may release the stored value for the corresponding specific parameter in the power saving configuration. If the UE does not receive a specific parameter in the power saving configuration, the UE may keep storing the stored value for the corresponding specific parameter in the power saving configuration.

In one example, if the UE has the stored (UE-specific) power saving configuration, the UE may ignore the received (cell-specific) power saving configuration via broadcast/unicast system information or via the dedicated RRC message from the serving cell (or gNB). For example, the value tag or version number of the received (cell-specific) power saving configuration is different from the value tag or version number of the stored (UE-specific) power saving configuration (e.g., the value tag or version number of the received (cell-specific) power saving configuration is older (or less than) the value tag or version number of the stored (UE-specific) power saving configuration).

In one example, if the UE has the stored power saving configuration received from the system information (e.g., a cell-specific power saving configuration received from the broadcast system information, or a UE-specific power saving configuration received from unicast other SI via on-demand SI procedure) when the UE receives the power saving configuration from the dedicated RRC message, the UE may discard the stored power saving configuration. The UE may store and/or apply the newly received power saving configuration.

In one example, if the UE has the stored power saving configuration received from the dedicated RRC message when the UE receives the power saving configuration from the system information (e.g., broadcast system information, unicast system information via on-demand SI procedure), the UE may ignore the newly received power saving configuration.

When the UE receives multiple power saving configurations from the serving cell (or gNB, no matter via the broadcast/unicast system information or the dedicated RRC message, the UE selects one of the multiple power saving configurations.

Two methods for the UE to select one of the multiple power saving configurations are disclosed.

Method 1. UE Autonomous Selection.

If the UE receives (at least one of) multiple power saving configurations from the serving cell (or gNB) (e.g., in the same RRC message, in different RRC messages, in the same broadcast/unicast system information, in different broadcast/unicast system information), the UE may store (all) the received multiple power saving configurations. If the UE receives (at least one of) multiple power saving configurations from the serving cell (or gNB) (e.g., in the same RRC message, in different RRC messages, in the same broadcast/unicast system information, in different broadcast/unicast system information), the UE may store (at least) one of the multiple power saving configurations. If the UE receives (at least one of) multiple power saving configurations from the serving cell (or gNB) (e.g., in the same RRC message, in different RRC messages, in the same broadcast/unicast system information, in different broadcast/unicast system information) and if the UE has stored at least one power saving configuration, the UE may replace/discard (part of) the at least one power saving configuration with the received (at least one of) multiple power saving configurations.

Among all the stored or received power saving configurations, the UE may apply one power saving configuration for the power saving operation. It is noted that the power saving configuration to be applied for the power saving operation is selected based on a specific rule (e.g., based on a UE's preference, a RRC state, a resource configuration (e.g., a configured grant configuration)) stored in the UE or applied for the UE. The UE may dynamically select one power saving configuration from the stored or received power saving configurations and apply the selected power saving configuration for the power saving operation. The UE may indicate its preferred power saving configuration to the NW (e.g., via UE Assistance Information). The UE may initiate a procedure for transmitting a UE assistance reporting (e.g., via UE Assistance Information) in some cases (e.g., upon being configured to provide the corresponding UE Assistance Information, upon change of its preference for the corresponding UE Assistance Information), especially when the UE is in RRC_CONNECTED state, but not limited thereto.

Alternatively, among all the stored or received power saving configurations (e.g., a first power saving configuration and a second power saving configuration), the UE may apply one power saving configuration for the power saving operation. The UE may select one power saving configuration to be applied based on an implicit manner. For example, if a specific configuration (e.g., configured grant for the UE in RRC_INACTIVE state) is configured, the UE may select the first power saving configuration (e.g., the first entry of power saving configuration list configured by the NW). Otherwise, the UE may select the second power saving configuration.

Alternatively, among all the stored or received power saving configurations, the UE may apply one power saving configuration for the power saving operation. When the UE selects (or applies) the selected power saving configuration, the UE may inform the serving cell (or gNB) of the selected (or applied) power saving configuration, even though the UE is in RRC_IDLE or RRC_INACTIVE state. For example, the UE (e.g., in RRC_IDLE or RRC_INACTIVE state) may transmit the index of the selected (or applied) power saving configuration to the serving cell (or gNB) via a small data transmission, via an RRC message or a lower layer signal (e.g., MAC CE, UCI). For another example, if the UE in RRC_CONNECTED state receives multiple power saving configurations to be applied when the UE enters RRC_IDLE/RRC_INACTIVE state, the UE in RRC_CONNECTED state may transmit the index of the selected (or applied) power saving configuration to the serving cell (or gNB) via an RRC message or via a lower layer signal (e.g., MAC CE, UCI). After the UE in RRC_CONNECTED state informs the serving cell (or gNB) of the selected (or to be applied) power saving configuration, the UE may perform RRC state transition to RRC_IDLE or RRC_INACTIVE state, and then apply the selected power saving configuration.

Method 2. BS-Assisted Selection.

There are four alternatives for BS-assisted selection.

Alternative 1. BS Assisted Selection with an Indication.

The UE may receive multiple power saving configurations from the serving cell (or gNB) (e.g., in the same RRC message, in different RRC messages, in the same broadcast/unicast system information, in different broadcast/unicast system information), and receive an indication associated with at least one of the multiple power saving configurations. Therefore, the UE may select the power saving configuration from the multiple power saving configurations according to the indication. The UE may receive the indication in the same power saving configuration which the indicator associates with. The UE may receive the indication in the same RRC message or the same system information where the UE receives the power saving configuration which the indication associates with. The indication may be a one-bit Boolean. The indication may be an ENUMERATED format (e.g., ENUMERATED {true}, ENUMERATED {true, false}). If the indication is set to "true", the UE may store and apply the power saving configuration which the indicator associates with. On the other hand, if the indication is set to "false" or absent, the UE may (1) store but not apply, (2) store and apply, or (3) ignore/discard the power saving configuration which the indicator associates with, for the power saving operation.

If the UE has stored and applied the power saving configuration which the indication associated with, and when the UE receives another power saving configuration with another indication associated therewith, the UE may perform at least one of the following actions: (1) the UE may stop/terminate the applied power saving operation, (2) the UE may discard/delete/release the stored power saving configuration, (3) the UE may store and apply the received other power saving configuration and perform the corresponding power saving operation, (4) the UE may select on its own to either (a) apply the stored power saving configuration and ignore (e.g., store but not apply, not store) the newly received power saving configuration, or (b) apply the newly received power saving configuration and ignore the stored power saving configuration (e.g., release/delete/discard the stored power saving configuration, keep storing the stored power saving configuration but not apply), and (5) the UE may apply the power saving configuration with specific rules (e.g., apply the power saving configuration with the shorter/longer DRX cycle).

Alternative 2. BS Assisted Selection with a Timer.

The UE receives multiple power saving configurations from the serving cell (or gNB) (e.g., in the same RRC message, in different RRC messages, in the same broadcast/unicast system information, in different broadcast/unicast system information), and receive a timer (initial) value associated with at least one of the multiple power saving configurations. The UE may receive the timer (initial) value in the same power saving configuration which the indication associates with. The UE may receive the timer (initial) value in the same RRC message or the same system information where the UE receives the power saving configuration which the timer (initial) value associates with. The timer (initial) value may be an ENUMERATED format (e.g., ENUMERATED {value #1, value #2, value #3, value #4, . . . }). In one example, a default value of the timer is applied while the UE receives the power saving configuration. One bit may be appended in the power saving configuration to configure the ON/OFF of the timer.

The UE may (re) start a timer with the timer (initial) value when the UE receives the dedicated RRC message, broadcast/unicast system information and/or associated power saving configuration(s). The UE may (re) start the timer with the timer (initial) value when the UE stores and/or applies the power saving configuration(s) which the timer associates with. The UE may (re) start the timer with the timer (initial) value when the UE receives the RRC Release message (with/without suspend configuration). The UE may (re) start the timer with the timer (initial) value when the UE enters RRC_IDLE and/or RRC_INACTIVE state. The UE may (re) start the timer with the timer (initial) value when the UE receives a NW indication (e.g., paging, short message, system information) in RRC_IDLE/RRC_INACTIVE state. The UE may (re) start the timer with the timer (initial) value when the UE performs a transmission (e.g., small data transmission) in RRC_IDLE/RRC_INACTIVE state.

The UE may stop the timer when the UE stores but does not apply the associated power saving configuration(s). The UE may stop the timer when the UE stops/suspends the power saving operation. The UE may stop the timer when the UE replaces the power saving configuration which the timer associates with. The UE (e.g., in RRC_IDLE or RRC_INACTIVE state) may stop the timer when the UE enters RRC_CONNECTED state. The UE may stop the timer when the UE initiates a Random Access (RA) procedure. The UE may stop the timer when the UE receives a specific NW indication (e.g., the NW indication may indicate to the UE to stop the first timer associated with a first power saving configuration, and/or (re-) start the second timer associated with a second power saving configuration). More specifically, the NW indication may indicate to the UE to stop/suspend/release a first power saving configuration, and/or apply the second timer associated with a second power saving configuration.

In one example, when the timer is running, the UE may apply the power saving configuration(s) which the timer associates with. In one example, when the timer is running, the UE may apply the power saving operation.

In one example, when the timer expires, the UE may not apply the power saving configuration(s) which the timer associates with. In one example, when the timer expires, the UE may clear/release/discard the power saving configuration(s) which the timer associates with. In one example, when the timer expires, the UE may stop/suspend the power saving operation.

The UE receives multiple power saving configurations from the serving cell (or gNB) (e.g., in the same RRC message, in different RRC messages, in the same broadcast/unicast system information, in different broadcast/unicast system information), and may be configured with a specific timer, where the specific timer may be used to control the switch of the multiple power saving configurations or the activation/deactivation of the multiple power saving configurations. The UE may receive the timer (initial) value in the same RRC message or the same system information where the UE receives the power saving configuration. In one example, the UE may be configured with a first power saving configuration, a second power saving configuration, and a specific timer.

The UE may (re) start a timer with the timer (initial) value when the UE receives the dedicated RRC message and/or broadcast/unicast system information and/or associated power saving configuration(s). The UE may (re) start the timer with the timer (initial) value when the UE stores and/or applies the power saving configuration(s) which the timer associates with. The UE may (re) start the timer with the timer (initial) value when the UE receives the RRC Release message (with/without suspend configuration). The UE may (re) start the timer with the timer (initial) value when the UE enters RRC_IDLE or RRC_INACTIVE state. The UE may (re) start the timer with the timer (initial) value when the UE receives a NW indication (e.g., paging, short message, system information) in RRC_IDLE/RRC_INACTIVE state. The UE may (re) start the timer with the timer (initial) value when the UE performs a transmission (e.g., small data transmission) in RRC_IDLE/RRC_INACTIVE state.

In one example, when the timer is running, the UE may apply the first power saving configuration. In one example, when the timer is running, the UE may not apply any power saving configuration (e.g., the UE may receive and store the power saving configuration(s), but the UE does not operate in the power saving mode).

In one example, when the timer expires, the UE may apply the second power saving configuration. More specifically, when the timer expires, the UE may switch a power saving configuration (e.g., DRX cycle) to another power saving configuration (e.g., DRX cycle). More specifically, when the timer expires, the UE may activate (or apply or start) the power saving operation based on at least one of the received/stored multiple power saving configurations.

The UE (e.g., in RRC_IDLE or RRC_INACTIVE state) may stop the timer when the UE enters RRC_CONNECTED state. The UE may stop the timer when the UE initiates an RA procedure. The UE may stop the timer when the UE receives a specific NW indication (e.g., the NW may indicate to the UE to stop the timer and/or apply the second power saving configuration). The UE may stop the timer and/or discard/remove/release the timer and power saving configuration when the UE (re) selects a new suitable cell, where the new suitable cell may be an intra-frequency cell, an inter-frequency cell, an intra-RAT cell, and/or an inter-RAT cell compared to the current serving/camped cell.

Alternative 3. BS Assisted Selection with DCI.

The UE receives multiple power saving configurations from the serving cell (or gNB) (e.g., in the same RRC message, in different RRC messages, in the same broadcast/unicast system information, in different broadcast/unicast system information). The UE may store (all or at least one of) the received power saving configurations. The UE may replace (all or at least one of) the stored power saving configuration(s) with the received power saving configurations. The UE may discard the replaced stored power saving configuration(s).

The UE may receive DCI from the serving cell (or gNB). When receiving the DCI, the UE may activate (or apply) the corresponding power saving configuration for power saving operation. When receiving the DCI, the UE may deactivate (or stop applying) the corresponding power saving configuration for power saving operation. For example, if the power saving configuration refers to the DRX cycle, the UE may switch/change/activate/deactivate/store/replace/apply/discard the DRX cycle based on the received DCI.

The DCI content may include a bitmap, where each bit corresponds to a power saving configuration. If the bit is set to "1" in the DCI content, the UE may activate (or apply) the corresponding power saving configuration. If the bit is set to "0" in the DCI content, the UE may deactivate (or stop applying) the corresponding power saving configuration.

The DCI content may include one bit, where the bit corresponds to a power saving configuration. The power saving configuration may be associated with an indication. The UE may receive the power saving configuration and the associated indication together. If the bit is set to "1", the UE may activate (or apply) the power saving configuration associated with the indication. If the bit is set to "0", the UE may deactivate (or stop applying) the power saving configuration associated with the indication.

The DCI content may include one bit, where the bit corresponds to a power saving configuration. The power saving configuration may be associated with a (running) timer. The UE may receive the power saving configuration and the associated (running) timer together. If the bit is set to "1", the UE may activate (or apply) the power saving configuration associated with the (running) timer. If the bit is set to "0", the UE may deactivate (or stop applying) the power saving configuration associated with the (running) timer. The UE may (re) start the timer when the UE receives the DCI that activates the power saving configuration. The UE may stop the timer when the UE receives the DCI that deactivates the power saving configuration. When the timer expires, the UE may deactivate (or release/clear/discard) the power saving configuration, and/or the UE may stop applying the associated power saving configuration, and/or the UE may stop the power saving operation. In other examples, the DCI content may include one bit, where the bit set to "1" is used to request UE to stop the applied power saving configuration, where no corresponding timer is associated with the power saving configuration.

The DCI (e.g., especially the CRC of the DCI) may be scrambled by a specific RNTI (e.g., Paging RNTI (P-RNTI), Inactive RNTI (I-RNTI)). The DCI may be transmitted via a power saving signal (e.g., wake up signal (WUS), go-to-sleep signal (GTSS)).

The UE may receive DCI from the serving cell (or gNB). When the UE receives the DCI but is not in the power saving mode, the UE may activate (or apply or start) the power saving operation. The UE may select one power saving configuration among the stored power saving configuration(s) to be applied for the power saving operation. The UE may apply the power saving configuration based on the bitmap in the DCI, if the received DCI includes the bitmap. The UE may apply the power saving configuration based on the indication associated with the power saving configuration. The UE may apply the power saving configuration based on the timer associated with the power saving configuration. When the UE receives the DCI and the UE is in the power saving mode, the UE may deactivate (or stop applying or suspend) the power saving operation. The UE may stop or re (start) the timer associated with the applied power saving configuration if the timer is running.

More specifically, the DCI may be a WUS signal where the gNB may request UE to wake up or sleep at the next upcoming DRX cycle. In another example, an index may be further appended to the DCI to indicate to the UE which power saving configuration can be used for the corresponding DRX behavior (e.g., the gNB may provide the index of the corresponding power saving configuration when the gNB transmits an RRC message including the power saving configuration(s) to the UE).

Alternative 4. BS Assisted Selection with a MAC CE

The UE may receive multiple power saving configurations from the serving cell (or gNB) (e.g., in the same RRC message, in different RRC messages, in the same broadcast/unicast system information, in different broadcast/unicast system information). The UE may store (all or at least one of) the received power saving configurations. The UE may replace (all or at least one of) the stored power saving configuration(s) with the received power saving configurations. The UE may discard the replaced stored power saving configuration(s). For example, if the power saving configuration refers to the DRX cycle, the UE may switch/change/activate/deactivate/store/replace/apply/discard the DRX cycle based on a MAC CE received from the serving cell (or gNB).

The UE (e.g., the MAC entity of the UE) may receive a MAC CE from the serving cell (or gNB). When receiving the MAC CE, the UE may activate (or apply) the corresponding power saving configuration. When receiving the MAC CE, the UE may deactivate (or stop applying) the corresponding power saving configuration.

The MAC CE content may include a bitmap, where each bit corresponds to a power saving configuration. If the bit is set to "1" in the MAC CE content, the UE may activate (or apply) the corresponding power saving configuration. If the bit is set to "0" in the MAC CE content, the UE may deactivate (or stop applying) the corresponding power saving configuration.

The MAC CE content may include one bit, where the bit corresponds to a power saving configuration. The power saving configuration may be associated with an indication. The UE may receive the power saving configuration and the associated indication together. If the bit is set to "1", the UE may activate (or apply) the power saving configuration associated with the indication. If the bit is set to "0", the UE may deactivate (or stop applying) the power saving configuration associated with the indication.

The MAC CE content may include one bit, where the bit corresponds to a power saving configuration. The power saving configuration may be associated with a (running) timer. The UE may receive the power saving configuration and the associated (running) timer together. If the bit is set to "1", the UE may activate (or apply) the power saving configuration associated with the (running) timer. If the bit is set to "0", the UE may deactivate (or stop applying) the power saving configuration associated with the (running) timer. The UE may (re) start the timer when the UE receives the MAC CE that activates the power saving configuration. The UE may stop the timer when the UE receives the MAC CE that deactivates the power saving configuration. When the timer expires, the UE may deactivate (or release/clear/discard) the power saving configuration, and/or the UE may stop applying the associated power saving configuration, and/or the UE may stop the power saving operation.

The UE (e.g., the MAC entity of the UE) may receive a MAC CE from the serving cell (or gNB). When the UE receives the MAC CE but is not in the power saving mode, the UE may activate (or apply or start) the power saving operation. The UE may select one power saving configuration among the stored power saving configuration(s) to be applied for the power saving operation. The UE may apply the power saving configuration based on the bitmap in the MAC CE, if the received MAC CE includes the bitmap. The UE may apply the power saving configuration based on the indication associated with the power saving configuration. The UE may apply the power saving configuration based on the timer associated with the power saving configuration. If multiple power saving configurations are indicated by the MAC CE to be activated, the UE may randomly apply one of the power saving configurations indicated by the MAC CE. If multiple power saving configurations are indicated by the MAC CE to be activated, the UE may apply the power saving configuration(s) with a specific rule (e.g., apply the power saving configuration with the shortest/longest DRX cycle). If at least two power saving configurations satisfy the specific rule, the UE may randomly apply one of them. When the UE receives the MAC CE and is in the power saving mode, the UE may deactivate (or stop applying or suspend) the power saving operation. The UE may stop or re (start) the timer associated with the applied power saving configuration if the timer is running.

UE-Specific Information for Power Saving Configuration

The UE may receive one or multiple power saving configurations from the serving cell (or gNB), where the serving cell (or gNB) may determine the one or multiple power saving configurations based on the UE-specific information (e.g., UE capability (e.g., Multiple-Input Multiple-Output (MIMO) layer), UE types (e.g., wearable devices, smart meters), UE's selected/registered/supported/requested/rejected slice (e.g., eMBB slice, URLLC slice, V2X slice, mMTC slice), whether the UE supports the power saving operation, and/or UE's application traffic (e.g., Voice over Internet Protocol (VoIP), Voice over NR (VoNR), Voice over LTE (VoLTE), video, messages, small data)). Before the determination, the serving cell (or gNB) may receive the UE-specific information from the UE. Alternatively, before the determination, the serving cell (or gNB) may configure the UE-specific information to the UE. It is noted that a slice may be identified by Single-Network Slice Selection Assistance Information (S-NSSAI).

For example, the UE in RRC_IDLE, RRC_INACTIVE, or RRC_CONNECTED state may receive a first RRC message from the serving cell (or gNB), where the first RRC message may be a UE Capability Enquiry message or a UE Information Request message (but is not limited thereto). The first RRC message may include information regarding a request for the UE to report the UE-specific information (e.g., UE capability, UE types, UE's selected/registered/supported/requested/rejected slice, whether the UE supports the power saving operation, and/or UE's application traffic (but not limited thereto)) to the serving cell (or gNB). In response to the reception of the first RRC message, the UE may transmit a second RRC message to the serving cell (or gNB), where the second RRC message may be a UE Capability Information message or a UE Information Response message (but is not limited thereto). The second RRC message may include information regarding the UE-specific information (e.g., UE capability, UE types, UE's selected/registered/supported/requested/rejected slice, whether the UE supports power saving operation, and/or UE's application traffic). In response to the transmission of the second RRC message, the UE may receive one or multiple power saving configurations from the serving cell (or gNB). The UE behavior in response to the reception of the one or multiple power saving configurations from the serving cell (or gNB) may be referred to the previously mentioned examples in this disclosure.

Furthermore, procedures for transitioning a UE (e.g., especially an RRC_IDLE/RRC_INACTIVE UE, but not limited thereto) between the power saving mode and a normal power mode (e.g., not in the power saving operation/mode) are disclosed.

A power-saving capable UE may operate in the power saving mode. A power-saving capable UE may be (pre) configured by the NW whether to operate in the power saving mode. A power-saving capable UE may trigger by itself whether to operate in the power saving mode. A power-saving capable UE may trigger by itself based on the (pre) configuration instructed by the NW whether to operate in the power saving mode.

A UE in the power saving mode is a power-saving capable UE and performs UE behaviors based on the previously mentioned power saving configuration(s). In one example, the UE in the power saving mode may apply the radio bearer configuration customized for power saving. In one example, the UE in the power saving mode may apply the power-saving specific rules for DL channel monitoring and reception. In one example, the UE in the power saving mode may perform paging monitoring based on the previously mentioned power saving configuration(s). In one example, the UE in the power saving mode may release/suspend some UL resources (e.g., configured grant (CG) for small data transmission), and/or may perform the radio resource measurement (RRM) relaxation.

The RRC_IDLE UE in the power saving mode and the RRC_INACTIVE UE in the power saving mode may have the same or different UE behaviors. In one example, the RRC_IDLE UE in the power saving mode may perform the RRM relaxation, while the RRC_INACTIVE UE in the power saving operation/mode may not perform the RRM relaxation. In one example, the RRC_INACTIVE UE with small data transmission in the power saving mode may release/suspend the UL resources (e.g., CG) for small data transmission, while the RRC_IDLE UE in the power saving mode may not have (pre)configured UL resources (e.g., CG).

A UE not in the power saving operation/mode may be in the normal power mode. A power-saving capable UE may switch between the power saving mode and the normal power mode. A power-saving capable UE may switch (or move) from the normal power mode to the power saving mode. On the other hand, a power-saving capable UE may stay in the normal power mode, or the power-saving capable UE may switch from the power saving mode to the normal power mode. The UE in normal operation may be equivalent to a UE in normal power mode.

A power-saving capable UE may switch from the power saving mode to the normal power mode. However, if some criteria/rules are not satisfied, the power-saving capable UE may stay in the power saving mode, or the power-saving capable UE may switch from the normal power mode to the power saving mode.

A non-power-saving capable UE may ignore any received configuration (e.g., RRC message, indication, timer, parameters for triggering events, power saving configuration/parameters, GTSS/WUS, MAC CE, DCI, UCI, paging DCI, paging message) applied for the transition from the normal power mode to the power saving mode.

The UE may switch (or move) to a mode (e.g., power saving mode or normal power mode) based on an NW instruction (e.g., an indication from the NW). For example, the UE may switch to the power saving mode (e.g., from the normal power mode) based on the NW instruction. It is noted that the same concept may be easily applied for the UE to switch to the normal power mode (e.g., from the power saving mode) based on the NW instruction.

In one example, a power-saving capable UE may switch (or move) to the power saving mode and/or operate in the power saving mode based on an indication from the NW. For example, upon the reception of the indication from the NW, the power-saving capable UE may switch (or move) to the power saving mode and/or operate in the power saving mode. For another example, upon the reception of an indication from the NW, the power-saving capable UE may switch (or move) to power saving mode and/or operate in the power saving mode. For another example, based on a timer control (e.g., the indication is associated with a value of a timer), the power-saving capable UE may switch (or move) to the power saving mode and/or operate in the power saving mode. For another example, according to a triggering condition considering the information from the indication, once the triggering condition is fulfilled, the UE may switch (or move) to the power saving mode and/or operate in the power saving mode.

In one example, a power-saving capable UE may switch (or move) to the normal power mode and/or operate in the normal power mode based on an indication from the NW. For example, upon the reception of the NW instruction, the power-saving capable UE may switch (or move) to normal power mode and/or operate in normal power mode. For another example, upon the reception of the indication from the NW, the power-saving capable UE may switch (or move) to normal power mode and/or operate in normal power mode. For another example, based on a timer control (e.g., the indication is associated with a value of a timer), the power-saving capable UE may switch (or move) to normal power mode and/or operate in normal power mode. For another example, according to a triggering condition considering the information from the indication (or from the NW instruction), once the triggering condition is fulfilled, the UE may switch (or move) to normal power mode and/or operate in normal power mode.

The previously mentioned examples may be applied for the UE in the normal power mode to switch (or move) to "power saving mode" and/or operate in "power saving mode". On the other hand, with the same concept, the previously mentioned examples may be applied for the UE in the power saving mode to switch (or move) to "normal power mode" and/or operate in "normal power mode".

The UE may fall back to the normal operation/mode based on a time manner. For example, if the UE does not receive any indication that is used for power saving mode and/or any indication that indicates to the UE to switch to/stay in the power saving mode for a period of time, the UE may switch to the normal power mode. More specifically, the UE may maintain a timer to control the switching behavior. On the other hand, the UE may fall back to the normal power mode based on a specific criterion. For example, if the UE does not successfully receive/decode/ monitor paging for the number of time or for a period of time, the UE may switch to the normal power mode. More specifically, the UE may maintain a counter or a timer to control the switching behavior.

It is noted that when the UE receives the indication from the NW (or receives the NW instruction), the UE may be in RRC_IDLE, RRC_INACTIVE, or RRC_CONNECTED state.

When the UE informs the NW or when the UE does not inform the NW that the UE would switch (or move) to the power saving mode and/or the UE would operate in the power saving mode, the UE may be in RRC_IDLE, RRC_I- NACTIVE, or RRC_CONNECTED state. The RRC state of the UE receiving the indication from the NW (or receiving the NW instruction) may be the same as or different from the RRC state of the UE informing or not informing the NW that the UE would switch (or move) to the power saving mode and/or the UE would operate in the power saving mode.

In one example, the UE receiving the indication from the NW (or receiving the NW instruction) may be in a first RRC state. Afterward, the UE may perform RRC state transition to a second RRC state. Afterward, the UE in the second RRC state may inform or not inform the NW. Afterward, the UE in the second RRC state may switch (or move) to the power saving mode and/or the UE may operate in the power saving mode.

In one example, the UE receiving the indication from the NW (or receiving the NW instruction) may be in a first RRC state. Afterward, the UE in the first RRC state may inform or not inform the NW. Afterward, the UE in the first RRC state may switch (or move) to the power saving mode and/or the UE may operate in the power saving mode. Afterward, the UE may optionally perform RRC state transition to a second RRC state.

In one example, the UE receiving the indication from the NW (or receiving the NW instruction) may be in a first RRC state. Afterward, the UE in the first RRC state may inform or not inform the NW. Afterward, the UE may perform RRC state transition to a second RRC state. Afterward, the UE in the second RRC state may switch (or move) to the power saving mode and/or the UE may operate in the power saving mode.

If the UE is in RRC_IDLE state, the UE may inform the NW via triggering an RA procedure (e.g., a 2-step RA procedure, a 4-step RA procedure, a contention-based RA procedure, a contention-free RA procedure, a slice-specific 2-step RA procedure, and/or a slice-specific 4-step RA procedure) or via initiating an RRC procedure (e.g., RRC (Connection) Setup procedure). For example, the UE may inform the NW via a specific preamble/PRACH resource. More specifically, the specific preamble/PRACH resource may be configured via system information by the NW. More specifically, the specific preamble/PRACH resource may be configured via dedicated signaling by the NW (e.g., the RRC_CONNECTED/RRC_INACTIVE UE may receive the configuration for the specific preamble/PRACH resource via RRC Release message (without suspend configuration) via the NW and then switch to RRC_IDLE state). The specific preamble/PRACH resources may be applied for the power saving mode switch. It is possible that the specific preamble/PRACH resources may be applied for slice-spe- cific RA procedures and the power saving mode switch.

If the UE is in RRC_INACTIVE state, the UE may inform the NW via triggering an RA procedure (e.g., a 2-step RA procedure, a 4-step RA procedure, a contention-based RA procedure, a contention-free RA procedure, a slice-specific 2-step RA procedure, and/or a slice-specific 4-step RA procedure) or via initiating an RRC procedure (e.g., RRC (Connection) Resume procedure) or via the UL grant for small data transmission. For example, the UE may inform the NW via a specific preamble/PRACH resource. More specifically, the specific preamble/PRACH resource may be configured via system information by the NW. More spe- cifically, the specific preamble/PRACH resource may be configured via dedicated signaling by the NW (e.g., the RRC_CONNECTED UE may receive the configuration for the specific preamble/PRACH resource via RRC Release message (with suspend configuration) via the NW and then switch to RRC_INACTIVE). The specific preamble/PRACH resources may be applied for the power saving mode switch. It is possible that the specific preamble/PRACH resources may be applied for slice-specific RA procedures and the power saving mode switch.

If the UE is in RRC_INACTIVE state, the UE may inform the NW via a UL resource, where the UL resource may be a configured grant configured for RRC_INACTIVE. More specifically, the configured grant may be (pre)configured via dedicated signaling (e.g., RRC Release message with suspend configuration).

If the UE is in RRC_CONNECTED state, the UE may inform the NW via triggering an RA procedure (e.g., a 2-step RA procedure, a 4-step RA procedure, a contention-based RA procedure, a contention-free RA procedure, a slice-specific 2-step RA procedure, and/or a slice-specific 4-step RA procedure) or via initiating an RRC procedure (e.g., RRC (Connection) Re-establishment procedure) or via the UL grant or via an RRC message (e.g., the RRC message may associate with the RRC message where the UE receives the indication from the NW (or receives the NW instruction)). For example, the UE may inform the NW via a specific preamble/PRACH resource. More specifically, the specific preamble/PRACH resource may be configured via system information and/or dedicated (RRC) signaling by the NW. The specific preamble/PRACH resources may be applied for the power saving mode switch. It is possible that the specific preamble/PRACH resources may be applied for slice-specific RA procedures and the power saving mode switch.

When the UE informs the NW or when the UE does not inform the NW that the UE would not switch (or would not move) to the power saving mode and/or the UE would not operate in the power saving mode, the UE may be in RRC_IDLE, RRC_INACTIVE, or RRC_CONNECTED state. In one example, the RRC state of the UE receiving the indication from the NW (or receiving the NW instruction) may be the same as or different from the RRC state of the UE informing or not informing the NW that the UE would not switch (or would not move) to the power saving mode and/or the UE would not operate in the power saving mode.

In one example, the UE receiving the indication from the NW (or receiving the NW instruction) may be in a first RRC state. Afterward, the UE may perform RRC state transition to a second RRC state. Afterward, the UE in the second RRC state may inform or not inform the NW. Afterward, the UE in the second RRC state may not switch (or may not move) to the power saving mode and/or the UE may not operate in the power saving mode.

In one example, the UE receiving the indication from the NW (or receiving the NW instruction) may be in a first RRC state. Afterward, the UE in the first RRC state may inform or not inform the NW. Afterward, the UE in the first RRC state may not switch (or may not move) to the power saving mode and/or the UE may not operate in the power saving mode. Afterward, the UE may optionally perform RRC state transition to a second RRC state.

In one example, the UE receiving the indication from the NW (or receiving the NW instruction) may be in a first RRC state. Afterward, the UE in the first RRC state may inform or not inform the NW. Afterward, the UE may perform RRC state transition to a second RRC state. Afterward, the UE in the second RRC state may not switch (or may not move) to the power saving mode and/or the UE may not operate in the power saving mode.

If the UE is in RRC_IDLE state, the UE may inform the NW via triggering an RA procedure (e.g., a 2-step RA procedure, a 4-step RA procedure, a contention-based RA procedure, a contention-free RA procedure, a slice-specific 2-step RA procedure, and/or a slice-specific 4-step RA procedure) or via initiating an RRC procedure (e.g., RRC (Connection) Setup procedure).

If the UE is in RRC_INACTIVE state, the UE may inform the NW via triggering an RA procedure (e.g., a 2-step RA procedure, a 4-step RA procedure, a contention-based RA procedure, a contention-free RA procedure, a slice-specific 2-step RA procedure, and/or a slice-specific 4-step RA procedure) or via initiating an RRC procedure (e.g., RRC (Connection) Resume procedure) or via the UL grant for small data transmission.

If the UE is in RRC_CONNECTED state, the UE may inform the NW via triggering an RA procedure (e.g., a 2-step RA procedure, a 4-step RA procedure, a contention-based RA procedure, a contention-free RA procedure, a slice-specific 2-step RA procedure, and/or a slice-specific 4-step RA procedure) or via initiating an RRC procedure (e.g., RRC (Connection) Re-establishment procedure) or via the UL grant or via an RRC message (e.g., the RRC message may associate with the RRC message where the UE receives the indication from the NW (or receives the NW instruction)).

When the UE informs the NW or when the UE does not inform the NW that the UE has switched (or moved) to the power saving mode and/or the UE has operated in the power saving mode, the UE may be in RRC_IDLE, RRC_INACTIVE, or RRC_CONNECTED state. In one example, the RRC state of the UE receiving the indication from the NW (or receiving the NW instruction) may be the same as or different from the RRC state of the UE informing or not informing the NW that the UE has switched (or moved) to the power saving mode and/or the UE has operated in the power saving mode.

In one example, the UE receiving the indication from the NW (or receiving the NW instruction) may be in a first RRC state. Afterward, the UE may perform RRC state transition to a second RRC state. Afterward, the UE in the second RRC state may switch (or move) to the power saving mode and/or the UE may operate in the power saving mode. Afterward, the UE in the second RRC state may inform or not inform the NW.

In one example, the UE receiving the indication from the NW (or receiving the NW instruction) may be in a first RRC state. Afterward, the UE in the first RRC state may switch (or move) to the power saving mode and/or the UE may operate in the power saving mode. Afterward, the UE in the first RRC state may inform or not inform the NW. Afterward, the UE may optionally perform RRC state transition to a second RRC state.

In one example, the UE receiving the indication from the NW (or receiving the NW instruction) may be in a first RRC state. Afterward, the UE in the first RRC state may switch (or move) to the power saving mode and/or the UE may operate in the power saving mode. Afterward, the UE may perform RRC state transition to the second RRC state. Afterward, the UE in the second RRC state may inform or not inform the NW.

If the UE is in RRC_IDLE state, the UE may inform the NW via triggering an RA procedure (e.g., a 2-step RA procedure, a 4-step RA procedure, a contention-based RA procedure, a contention-free RA procedure, a slice-specific 2-step RA procedure, and/or a slice-specific 4-step RA procedure) or via initiating an RRC procedure (e.g., RRC (Connection) Setup procedure).

If the UE is in RRC_INACTIVE state, the UE may inform the NW via triggering an RA procedure (e.g., a 2-step RA procedure, a 4-step RA procedure, a contention-based RA procedure, a contention-free RA procedure, a slice-specific 2-step RA procedure, and/or a slice-specific 4-step RA procedure) or via initiating an RRC procedure (e.g., RRC (Connection) Resume procedure) or via the UL grant for small data transmission.

If the UE is in RRC_CONNECTED state, the UE may inform the NW via triggering an RA procedure (e.g., a 2-step RA procedure, a 4-step RA procedure, a contention-based RA procedure, a contention-free RA procedure, a slice-specific 2-step RA procedure, and/or a slice-specific 4-step RA procedure) or via initiating an RRC procedure (e.g., RRC (Connection) Re-establishment procedure) or via the UL grant or via an RRC message (e.g., the RRC message may associate with the RRC message where the UE receives the indication from the NW (or receives the NW instruction)).

The NW instruction may include (but is not limited to) a UE-specific message (e.g., dedicated signaling, RRC message, paging message that includes UE identity, GTSS/WUS, system information which is unicast by the NW to the UE). More specifically, the UE-specific message may include:

1. RRC Release Message without Suspend Configuration.

For example, when the power-saving capable UE is in RRC_CONNECTED or in RRC_INACTIVE state, if the UE receives RRC Release message without suspend configuration from the NW, where the RRC Release message without suspend configuration may or may not include power-saving information (e.g., an indication, a power saving configuration), the power-saving capable UE may switch (or move) to the power saving mode and/or operate in the power saving mode. The power-saving capable UE may apply the received power-saving information, if any. The power-saving capable UE may replace/update (part of) the stored power-saving information (if any) with the received power-saving information. The power-saving capable UE may clear/discard/release the stored power-saving information (if any).

2. RRC Release Message with Suspend Configuration.

For example, when the power-saving capable UE is in RRC_INACTIVE or RRC_CONNECTED state, if the UE receives RRC Release message with suspend configuration from the NW, where the RRC Release message with suspend configuration may or may not include power-saving information (e.g., an indication, a power saving configuration), the power-saving capable UE may switch (or move) to the power saving mode and/or operate in the power saving mode. The power-saving capable UE may apply the received power-saving information if any. The power-saving capable UE may replace/update (part of) the stored power-saving information (if any) with the received power-saving information. The power-saving capable UE may clear/discard/release the stored power-saving information (if any). The power-saving information (e.g., an indication, a power saving configuration) may or may not be included in the suspend configuration of the RRC Release message with suspend configuration.

In one example, the UE may receive the RRC Release message with suspend configuration from the NW, which may or may not be in response to the transmission of an RRC message (e.g., RRC (Connection) Resume Request message) from the UE to the NW.

3. Paging Message

In one example, when the power-saving capable UE is in RRC_IDLE or RRC_INACTIVE state if the UE receives the paging message from the NW (and the ue-Identity included in the PagingRecord matches the UE identity allocated by upper layers or UE stored full I-RNTI), where the paging message may or may not include power-saving information (e.g., a power saving configuration), the power-saving capable UE may switch (or move) to the power saving mode and/or operate in the power saving mode. The power-saving capable UE may apply the received power-saving information if any. The power-saving capable UE may replace/update (part of) the stored power-saving information (if any) with the received power-saving information. The power-saving capable UE may clear/discard/release the stored power-saving information (if any). In one example, an indication may be included (or present) in the paging message to indicate each power-saving capable UE to switch (or move) to the power saving mode and/or operate in the power saving mode. In one example, there may be another UE power saving record (e.g., PowerSavingRecord) in the paging message to list UE(s) to be indicated to switch (or move) to the power saving mode and/or operate in the power saving mode. For example, a UE identity (e.g., NG-5G-S-TMSI or full I-RNTI) may be included in PowerSavingRecord. When a UE receives the paging message from the NW and the UE identity is included in the received PowerSavingRecord, the UE may switch (or move) to the power saving mode and/or operate in the power saving mode. It is noted that the paging message may include the PagingRecord and PowerSavingRecord.

In one example, the RRC_IDLE or RRC_INACTIVE UE may monitor paging occasions (or PDCCH monitoring occasions for paging). If the UE receives the DCI scrambled by an RNTI (e.g., P-RNTI) (on PDCCH), the UE may further receive the paging message (on PDSCH) based on the information (e.g., timer/frequency resource information for the reception of the paging message) in the DCI scrambled by an RNTI (e.g., P-RNTI).

4. GTSS/WUS

In one example, when the power-saving capable UE is in RRC_IDLE or RRC_INACTIVE state, the UE may monitor the GTSS/WUS on the monitoring occasion(s) of the GTSS/WUS. If the UE receives GTSS/WUS from the NW, where the GTSS/WUS may or may not include power-saving information (e.g., a power saving configuration), the power-saving capable UE may switch (or move) to the power saving mode and/or operate in the power saving mode. The power-saving capable UE may apply the received power-saving information if any. The power-saving capable UE may replace/update (part of) the stored power-saving information (if any) with the received power-saving information. The power-saving capable UE may clear/discard/release the stored power-saving information (if any).

After the power-saving capable UE receives the NW instruction and the UE would switch (or move) to the power saving mode and/or operate in the power saving mode, the UE may not inform the NW that the UE would switch (or move) to the power saving mode and/or operate in the power saving mode. For example, the UE may not transmit an RRC message to the NW in response to the reception of the NW instruction. For example, the UE may not transmit an RRC message to the NW in response to switching to the power saving mode. For example, the UE may not transmit a lower-layer indication (e.g., MAC CE, UCI) to the NW in response to the reception of the NW instruction. For example, the UE may not transmit a lower-layer indication (e.g., MAC CE, UCI) to the NW in response to switching to the power saving mode and/or operation in the power saving mode.

After the power-saving capable UE receives the NW instruction and if the UE would switch (or move) to the power saving mode and/or operate in the power saving mode, the UE may inform the NW that the UE would switch (or move) to the power saving mode and/or the UE would operate in the power saving mode. After the power-saving capable UE receives the NW instruction and if the UE has switched (or moved) to the power saving mode and/or operated in the power saving mode, the UE may inform the NW that the UE has switched (or moved) to the power saving mode and/or the UE has operated in the power saving mode. That is, after the UE has switched (or moved) to the power saving mode and/or operated in the power saving mode, the UE may inform the NW. Generally, the UE may inform the NW via an RRC message and/or via a lower-layer indication (e.g., MACE CE, UCI). For example, the UE may transmit an RRC message to the NW in response to the reception of the NW instruction. For example, the UE may transmit an RRC message to the NW in response to switching to the power saving mode and/or operation in the power saving mode. For example, the UE may transmit a lower-layer indication (e.g., MAC CE, UCI) to the NW in response to the reception of the NW instruction. For example, the UE may transmit a lower-layer indication (e.g., MAC CE, UCI) to the NW in response to switching to the power saving mode and/or operation in the power saving mode.

The content of the previously mentioned RRC message transmitted to the NW is disclosed.

The UE may not set any content related to the action of switching to the power saving mode and/or operation in the power saving mode in the RRC message. After the power-saving capable UE receives the NW instruction and if the UE would switch (or move) to the power saving mode and/or operate in the power saving mode, the UE may transmit such RRC message to the NW. Alternatively, after the power-saving capable UE receives the NW instruction and if the UE has switched (or moved) to the power saving mode and/or has operated in the power saving mode, the UE may transmit the RRC message to the NW. In one example, when the UE receives the NW instruction, the UE may determine whether to switch (or move) to the power saving mode based on a specific criterion. The UE may only transmit the RRC message to the NW if the specific criterion is satisfied.

The UE may set a Boolean indication (e.g., ENUMER-ATED {apply}) related to the action of switching to the power saving mode and/or operation in the power saving mode in the content of an RRC message. After the power-saving capable UE receives the NW instruction and if the UE would switch (or move) to the power saving mode and/or operate in the power saving mode, the UE may transmit the RRC message to the NW (e.g., the Boolean indication may be set as a first value). Alternatively, after the power-saving capable UE receives the NW instruction and if the UE has switched (or moved) to the power saving mode and/or has operated in the power saving mode, the UE may transmit the RRC message to the NW. On the contrary, after the power-saving capable UE receives the NW instruction and if the UE would not switch (or move) to the power saving mode and/or would not operate in the power saving mode, the UE would not transmit the RRC message to the NW. Alternatively, after the power-saving capable UE receives the NW instruction and if the UE would not switch (or move) to the power saving mode and/or would not operate in the power saving mode, the UE would transmit the RRC message (e.g., the Boolean indication may be set as a second value).

The UE may set power-saving related parameter/configuration related to the action of switching to the power saving mode and/or operation in the power saving mode in the content of the RRC message. After the power-saving capable UE receives the NW instruction and if the UE would switch (or move) to the power saving mode and/or operate in the power saving mode, the UE would transmit the RRC message to the NW. Alternatively, after the power-saving capable UE receives the NW instruction and if the UE has switched (or moved) to the power saving mode and/or has operated in the power saving mode, the UE would transmit the RRC message to the NW. For example, the power-saving related parameter/configuration may be the UE's preferred value(s) of power saving parameters in the power saving configuration, the UE's acknowledge/feedback to the power saving configuration(s) instructed by the NW, but is not limited thereto.

Moreover, the previously mentioned lower-layer indications (e.g., MAC CE, UCI) transmitted to the NW are disclosed.

In one example, the MAC CE may be a fixed size of zero bits.

In one example, the MAC CE may be a bit string that is byte aligned (e.g., multiple of 8 bits) in length. The UE (e.g., in RRC_IDLE state, in RRC_INACTIVE state, in RRC_CONNECTED state) may transmit (1) a power-saving specific MAC CE, (2) a legacy MAC CE, or (3) a revised legacy MAC CE to the NW in response to the reception of the NW instruction or in response to switching to the power saving mode and/or operation in the power saving mode.

The MAC CE may be identified by a MAC subheader with Logical Channel Identity (LCID), where the index of LCID may be (1) the reserved index (e.g., 35-39) as specified in Table 6.2.1-2 of the 3GPP TS 38.321 v16.0.0 with the LCID values corresponding to power-saving acknowledgment/non-acknowledgment in response to the reception of the NW instruction or in response to switching to the power saving mode and/or operation in the power saving mode, or (2) reusing the non-reserved index (e.g., the index has corresponding LCID values (rather than "reserved")) as specified in Table 6.2.1-2 of the 3GPP TS 38.321 v16.0.0 with the LCID values corresponding to power-saving acknowledgment/non-acknowledgment in response to the reception of the NW instruction or in response to switching to the power saving mode and/or operation in the power saving mode.

In one example, the UCI (e.g., ACK/NACK for HARQ operation) is encoded and transmitted via the physical uplink control channel (PUCCH) or is multiplexed onto the physical uplink shared channel (PUSCH) from the UE (e.g., in RRC_IDLE state, in RRC_INACTIVE state, in RRC_CONNECTED state) to the NW. The PUCCH/PUSCH may be indicated via uplink configured grant type 1 and/or uplink configured grant type 2. More specifically, the UE (e.g., when the UE is in RRC_CONNECTED state) may transmit the UCI before entering RRC_IDLE/RRC_INACTIVE state when receiving the NW instruction that indicates the UE to switch to the power saving operation/mode.

Generally, the lower-layer indications may be (but are not limited to) (1) a power-saving specific lower-layer indication, (2) a legacy lower-layer indication, and/or (3) a revised lower-layer indication. The content of the lower-layer indications may include at least one of the following:

The UE may not set any content related to the action of switching to the power saving mode and/or operation in the power saving mode in the lower-layer indication. After the power-saving capable UE receives the NW instruction and if the UE would switch (or move) to the power saving mode and/or operate in the power saving mode, the UE would transmit such lower-layer indication to the NW. Alternatively, after the power-saving capable UE receives the NW instruction and if the UE has switched (or moved) to the power saving mode and/or has operated in the power saving mode, the UE would transmit the lower-layer indication to the NW.

The UE may set at least one bit related to the action of switching to the power saving mode and/or operation in the power saving mode, in the content of the lower-layer indication. For example, the bit set to '1' may represent that the UE would switch (or has switched) to the power saving mode. After the power-saving capable UE receives the NW instruction and if the UE would switch (or move) to the power saving mode and/or operate in the power saving mode, the UE would transmit the lower-layer indication (the bit set to '1') to the NW. Alternatively, after the power-saving capable UE receives the NW instruction and if the UE has switched (or moved) to the power saving mode and/or has operated in the power saving mode, the UE would transmit the lower-layer indication to the NW. In one example, a combination of at least one bit related to the action of switching to the power saving mode and/or operation in the power saving mode and a legacy lower-layer indication may become a revised legacy lower-layer indication.

The UE may transmit a legacy lower-layer indication (e.g., C-RNTI MAC CE) to represent the action of switching to the power saving mode and/or operation in the power saving mode. After the power-saving capable UE receives the NW instruction and if the UE would switch (or move) to the power saving mode and/or operate in the power saving mode, the UE would transmit the lower-layer indication to the NW. Alternatively, after the power-saving capable UE receives the NW instruction and if the UE has switched (or moved) to the power saving mode and/or has operated in the power saving mode, the UE would transmit the lower-layer indication to the NW.

The UE may set at least one bit related to the cell identity and/or BWP identity, on which the UE would switch (or move) to the power saving mode and/or operate in the power saving mode, in the content of the lower-layer indication. The BWP identity may associate with a DL BWP or an UL BWP.

After the power-saving capable UE receives the NW instruction and if the UE would not switch (or move) to the power saving mode and/or would not operate in the power saving mode, the UE may not inform the NW that the UE would not switch (or move) to the power saving mode and/or would not operate in the power saving mode. For example, the UE may not transmit an RRC message to the NW in response to the reception of the NW instruction. For example, the UE may not transmit an RRC message to the NW in response to switching to the power saving mode and/or operation in the power saving mode. For example, the UE may not transmit the lower-layer indication (e.g., MAC CE, UCI) to the NW in response to the reception of the NW instruction. For example, the UE may not transmit the lower-layer indication (e.g., MAC CE, UCI) to the NW in response to switching to the power saving mode and/or operation in the power saving mode.

After the power-saving capable UE receives the NW instruction and if the UE would not switch (or move) to the power saving mode and/or would not operate in the power saving mode, the UE may inform the NW that the UE would not switch (or move) to the power saving mode and/or the UE would not operate in the power saving mode. For example, the UE may transmit an RRC message to the NW in response to the reception of the NW instruction. For example, the UE may transmit an RRC message to the NW in response to switching to the power saving mode and/or operation in the power saving mode. For example, the UE may transmit the lower-layer indication (e.g., MAC CE, UCI) to the NW in response to the reception of the NW instruction. For example, the UE may transmit the lower-layer indication (e.g., MAC CE, UCI) to the NW in response to switching to the power saving mode and/or operation in the power saving mode.

As to the content of the previously mentioned RRC message transmitted to the NW, the UE may not set any content related to the action of switching to the power saving mode and/or operation in the power saving mode in the RRC message. After the power-saving capable UE receives the NW instruction and if the UE would not switch (or move) to the power saving mode and/or operate in the power saving mode, the UE would transmit the RRC message to the NW.

As to the content of the previously mentioned RRC message transmitted to the NW, the UE may set a Boolean indication (e.g., ENUMERATED {NotApply}, ENUMER-ATED {Apply, NotApply}) related to the action of switching to the power saving mode and/or operation in the power saving mode in the content of the RRC message. After the power-saving capable UE receives the NW instruction and if the UE would not switch (or move) to the power saving mode and/or operate in the power saving mode, the UE would transmit the RRC message including a Boolean indication 'NotApply' to the NW.

As to the content of the previously mentioned RRC message transmitted to the NW, the UE may set the value of power-saving related parameter/configuration related to the action of switching to the power saving mode and/or operation in the power saving mode to be ABSENT in the content of the RRC message. After the power-saving capable UE receives the NW instruction and if the UE would not switch (or move) to the power saving mode and/or would not operate in the power saving mode, the UE would transmit the RRC message to the NW.

As to the lower-layer indications (e.g., MAC CE, UCI), the lower-layer indications may be (but are not limited to) (1) a power-saving specific lower-layer indication, (2) a legacy lower-layer indication, and/or (3) a revised lower-layer indication. The content of the lower-layer indications may include at least one of the following:

The UE may not set any content related to the action of switching to the power saving mode and/or operation in the power saving mode in the lower-layer indication. After the power-saving capable UE receives the NW instruction and if the UE would not switch (or move) to the power saving mode and/or would not operate in the power saving mode, the UE would transmit the lower-layer indication to the NW. Alternatively, after the power-saving capable UE receives the NW instruction and if the UE has switched (or moved) to the power saving mode and/or has operated in the power saving mode, the UE would transmit the lower-layer indication to the NW.

The UE may set at least one bit related to the action of switching to the power saving mode and/or operation in the power saving mode in the content of the lower-layer indication. For example, one bit '1' may represent that the UE would switch (or has switched) to the power saving mode. After the power-saving capable UE receives the NW instruction and if the UE would switch (or move) to the power saving mode and/or operate in the power saving mode, the UE would transmit the lower-layer indication to the NW. Alternatively, after the power-saving capable UE receives the NW instruction and if the UE has switched (or moved) to the power saving mode and/or has operated in the power saving mode, the UE would transmit the lower-layer indication to the NW. In one example, a combination of at least one bit related to the action of switching to the power saving mode and/or operation in the power saving mode and a legacy lower-layer indication may become a revised legacy lower-layer indication.

The UE may transmit a legacy lower-layer indication (e.g., C-RNTI MAC CE) to represent the action of switching to the power saving mode and/or operation in the power saving mode. After the power-saving capable UE receives the NW instruction and if the UE would switch (or move) to the power saving mode and/or operate in the power saving mode, the UE would transmit the lower-layer indication to the NW. Alternatively, after the power-saving capable UE receives the NW instruction and if the UE has switched (or moved) to the power saving mode and/or has operated in the power saving mode, the UE would transmit the lower-layer indication to the NW.

Upon the reception of the NW instruction including a power-saving related indication, the power-saving capable UE may switch (or move) to the power saving mode and/or operate in the power saving mode depending on the power-saving related indication. Upon the reception of the NW instruction including a power-saving related indication, the power-saving capable UE may not switch (or move) to the power saving mode and/or operate in the power saving mode depending on the power-saving related indication.

The NW instruction may include (but is not limited to) UE-specific message (e.g., dedicated signaling, RRC message, paging message that includes UE identity, system information which is unicast by the NW to the UE). More specifically, the UE-specific message may include:

1. RRC Release Message without Suspend Configuration.

In one example, when the power-saving capable UE is in RRC_CONNECTED state or in RRC_INACTIVE state, if the UE receives RRC Release message without suspend configuration from the NW, and if the RRC Release message without suspend configuration includes power-saving information (e.g., a power saving configuration), the power-saving capable UE may switch (or move) to the power saving mode and/or operate in the power saving mode. The power-saving capable UE may apply the received power-saving information, if any. The power-saving capable UE may replace the stored power-saving information (if any) with the received power-saving information. The power-saving capable UE may clear/discard/release the stored power-saving information (if any). If the UE receiving the RRC Release message without suspend configuration is in RRC_CONNECTED state, the UE may transition to RRC_INACTIVE state. If the UE receiving the RRC Release message without suspend configuration is in RRC_INACTIVE state, the UE may remain in RRC_INACTIVE state.

In one example, when the power-saving capable UE is in RRC_CONNECTED state or RRC_INACTIVE state, if the UE receives RRC Release message without suspend configuration from the NW, and if the RRC Release message without suspend configuration includes power-saving information (e.g., an indication, a power saving configuration) with absent values, the power-saving capable UE may not switch (or move) to the power saving mode and/or operate in the power saving mode. If the UE receiving the RRC Release message without suspend configuration is in RRC_CONNECTED state, the UE may switch to RRC_IDLE state. If the UE receiving the RRC Release message without suspend configuration is in RRC_INACTIVE state, the UE may transition to RRC_IDLE state.

In one example, when the power-saving capable UE is in RRC_CONNECTED state or RRC_INACTIVE state, if the UE receives RRC Release message without suspend configuration from the NW, and if the RRC Release message without suspend configuration does not include power-saving information (e.g., an indication, a power saving configuration), the power-saving capable UE may not switch (or move) to the power saving mode and/or may not operate in the power saving mode. If the UE receiving the RRC Release message without suspend configuration is in RRC_CONNECTED state, the UE may switch to RRC_IDLE state. If the UE receiving the RRC Release message without suspend configuration is in RRC_INACTIVE state, the UE may transition to RRC_IDLE state.

2. RRC Release Message with Suspend Configuration

In one example, when the power-saving capable UE is in RRC_INACTIVE state or RRC_CONNECTED state, if the UE receives RRC Release message with suspend configuration from the NW, and if the RRC Release message with suspend configuration includes power-saving information (e.g., an indication, a power saving configuration), the power-saving capable UE may switch (or move) to the power saving mode and/or operate in the power saving mode. The power-saving capable UE may apply the received power-saving information if any. The power-saving capable UE may replace the stored power-saving information (if any) with the received power-saving information. The power-saving capable UE may clear/discard/release the stored power-saving information (if any). The power-saving information (e.g., an indication, a power saving configuration) may or may not be included in the suspend configuration of the RRC Release message with suspend configuration. If the UE receiving the RRC Release message with suspend configuration is in RRC_CONNECTED state, the UE may switch to RRC_INACTIVE state. If the UE receiving the RRC Release message with suspend configuration is in RRC_INACTIVE state, the UE may remain in RRC_INACTIVE state.

In one example, when the power-saving capable UE is in RRC_CONNECTED state or RRC_INACTIVE state, if the UE receives RRC Release message with suspend configuration from the NW, and if the RRC Release message with suspend configuration includes power-saving information (e.g., an indication, a power saving configuration) with absent values, the power-saving capable UE may not switch (or move) to the power saving mode and/or operate in the power saving mode. If the UE receiving the RRC Release message with suspend configuration is in RRC_CONNECTED state, the UE may switch to RRC_INACTIVE state. If the UE receiving the RRC Release message with suspend configuration is in RRC_INACTIVE state, the UE may remain in RRC_INACTIVE state.

In one example, when the power-saving capable UE is in RRC_CONNECTED state or RRC_INACTIVE state, if the UE receives RRC Release message with suspend configuration from the NW, and if the RRC Release message with suspend configuration does not include power-saving information (e.g., an indication, a power saving configuration), the power-saving capable UE may not switch (or move) to the power saving mode and/or may not operate in the power saving mode. If the UE receiving the RRC Release message with suspend configuration is in RRC_CONNECTED state, the UE may transition to RRC_INACTIVE state. If the UE receiving the RRC Release message with suspend configuration is in RRC_INACTIVE state, the UE may remain in RRC_INACTIVE state.

3. Paging Message

In one example, when the power-saving capable UE is in RRC_IDLE state or RRC_INACTIVE state, if the UE receives the paging message from the NW (and/or the ue-Identity included in the PagingRecord matches the UE identity allocated by upper layers or UE stored full I-RNTI), and if the paging message includes power-saving information (e.g., an indication, a power saving configuration), the power-saving capable UE may switch (or move) to the power saving mode and/or operate in the power saving mode. The power-saving capable UE may apply the received power-saving information, if any. The power-saving capable UE may replace/update (part of) the stored power-saving information (if any) with the received power-saving information. The power-saving capable UE may clear/discard/release the stored power-saving information (if any). If the UE receiving the paging message is in RRC_INACTIVE state, the UE may remain in RRC_INACTIVE state. If the UE receiving the paging message is in RRC_IDLE state, the UE may remain in RRC_IDLE state. In one example, an indication may be included (or present) in the paging message to indicate each power-saving capable UE to switch (or move) to the power saving mode and/or operate in the power saving mode based on the power-saving information received in the paging message. In one example, there may be another UE power saving record (e.g., PowerSavingRecord) in the paging message to list UE(s) to be indicated to switch (or move) to the power saving mode and/or operate in the power saving mode based on the power-saving information received in the paging message. For example, UE identity (e.g., NG-5G-S-TMSI or full I-RNTI) may be included in PowerSavingRecord. When a UE receives the paging message from the NW and the UE identity is included in the received PowerSavingRecord, the UE may switch (or move) to the power saving mode and/or operate in the power saving mode based on the power-saving information received in the paging message.

In one example, when the power-saving capable UE is in RRC_IDLE state or RRC_INACTIVE state, if the UE receives the paging message from the NW, and if the paging message includes power-saving information (e.g., a power saving configuration) with absent values, the power-saving capable UE may not switch (or move) to the power saving mode and/or operate in the power saving mode. If the UE receiving the paging message is in RRC_INACTIVE state, the UE may remain in RRC_INACTIVE state. If the UE receiving the paging message is in RRC_IDLE state, the UE may remain in RRC_IDLE state.

In one example, when the power-saving capable UE is in RRC_IDLE state or RRC_INACTIVE state, if the UE receives the paging message from the NW, and if the paging message does not include power-saving information (e.g., an indication, a power saving configuration), the power-saving capable UE may not switch (or move) to the power saving mode and/or operate in the power saving mode. If the UE receiving the paging message is in RRC_INACTIVE state, the UE may remain in RRC_INACTIVE state. If the UE receiving the paging message is in RRC_IDLE state, the UE may remain in RRC_IDLE state.

Upon the reception of the lower-layer indication (e.g., MAC CE, DCI) including a power-saving related indication, the power-saving capable UE may switch (or move) to the power saving mode and/or operate in the power saving mode depending on the power-saving related indication. Upon the reception of the lower-layer indication (e.g., MAC CE, DCI) including a power-saving related indication, the power-saving capable UE may not switch (or move) to the power saving mode and/or operate in the power saving mode depending on the power-saving related indication. For example, the power-saving related indication may be one bit. If the one bit is set to '1', the power-saving capable UE may switch (or move) to the power saving mode and/or operate in the power saving mode. If the one bit is set to '0' or if the bit field is absent, the power-saving capable UE may not switch (or move) to the power saving mode and/or may not operate in the power saving mode.

Under the previously mentioned NW instruction (e.g., an indication from the NW), a timer for the UE to determine whether to switch to the power saving mode is disclosed. For example, when the timer is running, the UE may not switch to the power saving mode. The UE may switch to the power saving mode if the timer expires or is not running. In another example, when the timer is running, the UE may not switch to the normal operation (e.g., not in the power saving mode). The UE may switch to the normal power mode if the timer expires or is not running.

In one example, the UE may receive a timer value associated with power-saving mode transition/switching via UE-specific dedicated signaling (e.g., RRC Release with suspend configuration message, RRC Release without suspend configuration message, paging message) from the NW. In another example, the UE may be preconfigured with a timer value associated with power-saving mode transition/switching.

The UE may (re) start a timer with the initial timer value as the timer value associated with power-saving mode transition/switching in at least one of several conditions (but not limited thereto): (1) when the UE receives UE-specific dedicated signaling including the timer value associated with power-saving mode transition/switching, (2) when the UE receives UE-specific dedicated signaling not including a timer value associated with power-saving mode transition/switching, and (3) when the UE receives a UE-specific lower-layer indication (e.g., MAC CE, DCI). For (2) and (3), the initial timer value may be the preconfigured timer value associated with power-saving mode transition/switching. For (1), the initial timer value may be the timer value associated with power-saving mode transition/switching included in the received UE-specific dedicated signaling.

The UE may (re) start a timer when receiving one or multiple of the following message(s) (but not limited thereto): RRC release (with/without suspend configuration), GTSS, WUS, paging DCI, short message, system information, paging message and the UE identity of the paging message matches the UE identity, paging message and the UE identity of the paging message does not match the UE identity, and RRC Reconfiguration including conditional reconfiguration IE.

The UE may (re)start a timer when the UE transmits UL data via a UL resource (e.g., PRACH, PUCCH, PUSCH, configured grant) when the UE is in RRC_IDLE state or RRC_INACTIVE state.

The UE may stop the timer in at least one of several conditions (but not limited thereto): (1) upon the UE performing RRC state transition, (2) upon the UE (re) establishing radio bearer (e.g., Signaling Radio Bearer (SRB), Data Radio Bearer (DRB), especially SRB1 between the UE and the PCell), (3) upon the UE receiving a paging message including the UE identity, (4) upon the UE performing small data transmission, (5) upon the UE transmitting an RRC message, (6) upon the UE initiating an RA procedure, (7) upon the UE initiating an RRC connection resume procedure, and (8) upon the UE performing cell (re) selection to another cell, where another cell may be an intra-frequency cell, an inter-frequency cell, an intra-RAT cell, or an inter-RAT cell compared to the currently camped cell.

Upon the timer expiring, the power-saving capable UE may switch (or move) to the power saving mode and/or operate in the power saving mode.

Under the previously mentioned NW instruction (e.g., an indication from the NW), an event triggered method for a UE to determine whether to switch to the power saving mode is disclosed. In other words, the UE may switch (or move) to the power saving mode and/or operate in the power saving mode depending on whether an event occurs. The UE may be (pre) configured with the parameters required to trigger the event or may receive the parameters required to trigger the event.

In one example, the UE may receive a signal quality/strength threshold (e.g., Reference Signal Received Power (RSRP) threshold, Reference Signal Received Quality (RSRQ) threshold, Signal to Interference plus Noise Ratio (SINR) threshold, Received Signal Strength Indicator (RSSI) threshold) associated with power-saving mode transition/switching via UE-specific dedicated signaling (e.g., RRC Release with suspend configuration message, RRC Release without suspend configuration message, paging message) from the NW. The UE may be preconfigured with a signal quality/strength threshold (e.g., RSRP threshold, RSRQ threshold, SINR threshold, RSSI threshold) associated with power-saving mode transition/switching. If the UE's measured signal quality/strength to the serving cell is below the threshold, the UE may switch (or move) to the power saving mode and/or operate in the power saving mode. If the UE receives the signal quality/strength threshold, the UE may discard/release the stored signal quality/strength threshold. If the UE receives the signal quality/strength threshold, the UE may store this received signal quality/strength threshold.

In one example, the UE may receive a periodicity value associated with power-saving mode transition/switching via UE-specific dedicated signaling (e.g., RRC Release with suspend configuration message, RRC Release without suspend configuration message, paging message) from the NW. The UE may be preconfigured with a periodicity value associated with power-saving mode transition/switching. If the UE has not performed UL data/signaling transmission and/or if the UE has not received DL data/signaling for a duration longer than the periodicity value, the UE may switch (or move) to the power saving mode and/or operate in the power saving mode. If the UE receives the periodicity value, the UE may discard/release the stored periodicity value. If the UE receives the periodicity value, the UE may store this received periodicity value.

The power-saving capable UE may autonomously switch (or move) to the power saving mode and/or operate in the power saving mode without receiving the NW instruction/indication/parameters to trigger an event in advance.

The power-saving capable UE may reply to the NW via UE-specific dedicated signaling (e.g., an RRC message) or via a lower-layer indication (e.g., MAC CE, UCI) after/upon the UE autonomously switches (or moves) to the power saving mode and/or operation in the power saving mode.

The power-saving capable UE may not reply to the NW via UE-specific dedicated signaling (e.g., an RRC message) or via a lower-layer indication (e.g., MAC CE, UCI) after/upon the UE autonomously switches (or moves) to the power saving mode and/or operation in the power saving mode.

The power-saving capable UE may autonomously switch (or move) to the normal power mode and/or operate in the normal power mode without receiving the NW instruction/indication/parameters to trigger an event in advance.

The power-saving capable UE may reply to the NW via UE-specific dedicated signaling (e.g., an RRC message) or a lower-layer indication (e.g., MAC CE, UCI) after/upon the UE autonomously switches (or moves) to the normal power mode and/or operation in the normal power mode.

The power-saving capable UE may not reply to the NW via UE-specific dedicated signaling (e.g., an RRC message) or a lower-layer indication (e.g., MAC CE, UCI) after/upon the UE autonomously switches (or moves) to the normal power mode and/or operation in the normal power mode.

The UE may indicate whether it supports the power saving operation/mode. For example, upon the UE receives the UE Capability Enquiry from the NW, the UE may transmit the UE Capability Information to the NW. The UE Capability Information may include a Boolean indication (e.g., ENUMERATED {support}, ENUMERATED {support, not support}). If the UE transmits UE Capability Information with "support", the UE may indicate to the NW that it supports the power saving operation/mode. If the UE transmits UE Capability Information with "not support" or with an absent value for the Boolean indication, the UE may indicate to the NW that it does not support the power saving operation/mode. For example, the Boolean indication is conditionally mandatory for power-saving capable UEs. The UE may (mandatorily) indicate whether it supports power saving operation/mode in RRC_IDLE state and/or RRC_INACTIVE states. The UE may (mandatorily) indicate whether it supports power saving operation/mode in Frequency Range 1 (FR1) and/or FR2.

For example, the UE may transmit UE Capability Information to the NW, where the UE Capability Information may include a Boolean indication (e.g., ENUMERATED {support}, ENUMERATED {support, not support}) in association with an RRC state indication (e.g., ENUMERATED {RRC_IDLE, RRC_INACTIVE, RRC_CONNECTED}). The combination of the Boolean indication and the RRC state indication may indicate whether the UE supports (or does not support) the power saving operation/mode when the UE is in the indicated RRC state.

For example, the UE may transmit UE Capability Information to the NW, where the UE Capability Information may include a Boolean indication (e.g., ENUMERATED {support}, ENUMERATED {support, not support}) in association with a frequency range indication (e.g., ENUMERATED {FR1, FR2}, ENUMERATED {FR1}, ENUMERATED {FR2}). The combination of the Boolean indication and the frequency range indication may indicate whether the UE supports (or does not support) the power saving operation/mode when the UE operates in a frequency range indicated by the frequency range indication. FR1 and FR2 may represent two (disjoint) frequency ranges. For example, FR1 may represent a frequency range below 6 GHz (but not limited thereto). FR2 may represent a frequency range equal to or above 6 GHz. If the format of the frequency range indication is ENUMERATED {FR1, FR2}, the UE may indicate the FR1 frequency range by the frequency range indication 'FR1', indicate the FR2 frequency range by the frequency range indication 'FR2', and/or indicate a frequency range not covered by FRI and FR2 by using an absent value of the frequency range indication. If the format of the frequency range indication is ENUMERATED {FR1}, the UE may indicate the FRI frequency range by the frequency range indication 'FRI' and indicate the FR2 frequency range and/or a frequency range not covered by FRI by using an absent value of the frequency range indication. If the format of the frequency range indication is ENUMERATED {FR2}, the UE may indicate the FR2 frequency range by the frequency range indication 'FR2' and indicate the FRI frequency range and/or a frequency range not covered by FR2 by using an absent value of the frequency range indication.

The UE may indicate the preference of power saving operation/mode via UE Assistance Information. The UE may initiate the procedure for transmitting the UE assistance reporting in some cases (e.g., upon being configured to provide the corresponding UE assistance information, upon change of its preference for the corresponding UE assistance information).

The terms, such as NW, RAN, cell, camped cell, serving cell, BS, gNB, eNB, and ng-eNB, are used interchangeably. Some of these terms may refer to the same network entity.

The previously mentioned examples may be applied to any RAT. The RAT may be (but not limited to) NR, NR-U (NR-Unlicensed, NR-based access to unlicensed spectrum), LTE, E-UTRA connected to 5GC, LTE connected to 5GC, E-UTRA connected to EPC, and LTE connected to EPC.

The previously mentioned examples may be applied for the UEs in public networks, or in private networks (e.g., non-public network (NPN), standalone NPN (SNPN), public network integrated NPN (PNI-NPN)).

The previously mentioned examples may be used for licensed frequency and/or unlicensed frequency.

System information (SI) may refer to MIB, SIB1, and other SI. Minimum SI may include MIB and SIB1. Other SI may refer to SIB3, SIB4, SIB5, and other SIB(s) (e.g., SNPN-specific SIB, PNI-NPN-specific SIB, power saving specific SIB). The UE may receive the SI either via broadcast or via unicast. In response to the UE's system information request, the UE may receive the requested SI either via broadcast or via unicast.

Dedicated (RRC) signaling may refer to (but is not limited to) RRC message(s), for example, RRC (Connection) Setup Request message, RRC (Connection) Setup message, RRC (Connection) Setup Complete message, RRC (Connection) Reconfiguration message, RRC Connection Reconfiguration message including the mobility control information, RRC Connection Reconfiguration message without the mobility control information inside, RRC Reconfiguration message including the configuration with sync, RRC Reconfiguration message without the configuration with sync inside, RRC (Connection) Reconfiguration Complete message, RRC (Connection) Resume Request message, RRC (Connection) Resume message, RRC (Connection) Resume Complete message, RRC (Connection) Reestablishment Request message, RRC (Connection) Reestablishment message, RRC (Connection) Reestablishment Complete message, RRC (Connection) Reject message, RRC (Connection) Release message, RRC System Information Request message, UE Assistance Information message (e.g., UE Assistance Information NR message, UE Assistance Information EUTRA message), UE Capability Enquiry message, UE Capability Information message, UE Information Request message, and UE Information Response message.

The RRC_CONNECTED UE, RRC_INACTIVE UE, and RRC_IDLE UE may apply the previously mentioned examples.

An RRC_CONNECTED UE may be configured with an active BWP with common search space configured to monitor system information or paging.

Generally, the previously mentioned examples may be applied to the PCell and the UE. The previously mentioned examples may be applied to the PSCell and the UE. The previously mentioned examples may be applied to the SCell and the UE. A serving cell may refer to (but is not limited to) a PCell, a PSCell, or an SCell.

DCI may refer to a PDCCH resource with CRC scrambled by an RNTI. The RNTI may relate to power saving (e.g., PS-RNTI, but not limited thereto). Alternatively, the DCI may be applied to a physical signal.

GTSS/WUS is disclosed as follows: in NR, a new signaling/indication may be used for reducing unnecessary PDCCH monitoring for paging. The new signaling/indication may be named GTSS and/or WUS in the present disclosure. The main function of the GTSS may be used to inform the UE when the UE could skip the configured PDCCH monitoring occasions. On the contrary, the main function of the WUS may be used to inform UE when the UE should wake up to monitor the configured PDCCH monitoring occasions. For example, the UE could skip the PDCCH monitoring occasions when the UE does not wake up.

The UE in the power saving mode/operation may be switched to the normal power mode/operation while the UE in the normal power mode/operation may be switched to the power saving mode/operation.

FIG. 1 is a flowchart illustrating a method/process 100 for a UE to perform a power saving operation. In action 102, the process 100 may start by receiving, from a BS, multiple power saving configurations, while the UE is in an RRC idle (e.g., RRC_IDLE) or an RRC inactive (e.g., RRC_INACTIVE) state. In action 104, the process 100 may select one of the multiple power saving configurations according to a rule predefined in the UE or a first indication received from the BS. In action 106, the process 100 may apply the selected one of the multiple power saving configurations for the power saving operation. The process 100 may then end.

The power saving configuration may include at least one of a DRX configuration, a paging related configuration, a PDCCH monitoring related configuration, or a parameter for configuring the UE to operate in a power saving mode.

In one example, the UE may receive, from the BS, a first power saving configuration, while the UE is in an RRC connected state, and a second power saving configuration of the multiple power saving configurations is different from the first power saving configuration.

In one example, the UE may select one of the multiple power saving configurations based on at least one of a preference of the UE, an RRC state of the UE, or a resource configuration stored in the UE or applied to the UE.

In one example, the UE may select one of the multiple power saving configurations based on the first indication, and the first indication is associated with the selected one of the multiple power saving configurations.

In one example, the UE may receive, from the BS, a value of a timer associated with the multiple power saving configurations, and start the timer corresponding to the selected one of the multiple power saving configurations according to the value. In this case, the UE may apply the selected one of the multiple power saving configurations for the power saving operation until the timer expires.

In one example, the UE may perform the power mode switching, and the power mode switching may include switching between a normal power mode and a power saving mode according to a second indication received from the BS, where the second indication may be associated with at least one of a value of a timer associated with the power mode switching or a condition for the power mode switching. In this case, the UE may start the timer according to the value, and switch from the normal power mode to the power saving mode when the timer expires. When the UE switches from the normal power mode to the power saving mode, the UE may apply the selected one of the multiple power saving configurations for the power saving operation.

In another example, the UE may switch from the normal power mode to the power saving mode when a measured signal strength is lower than at least one of a RSRP threshold, a RSRQ threshold, a SINR threshold, or an RSSI threshold.

In one example, the UE may transmit, to the BS, signal indicating that the UE is switching from the normal power mode to the power saving mode, where the signal may include at least one of an RRC message, a MAC CE, or UCI.

Figure 2:
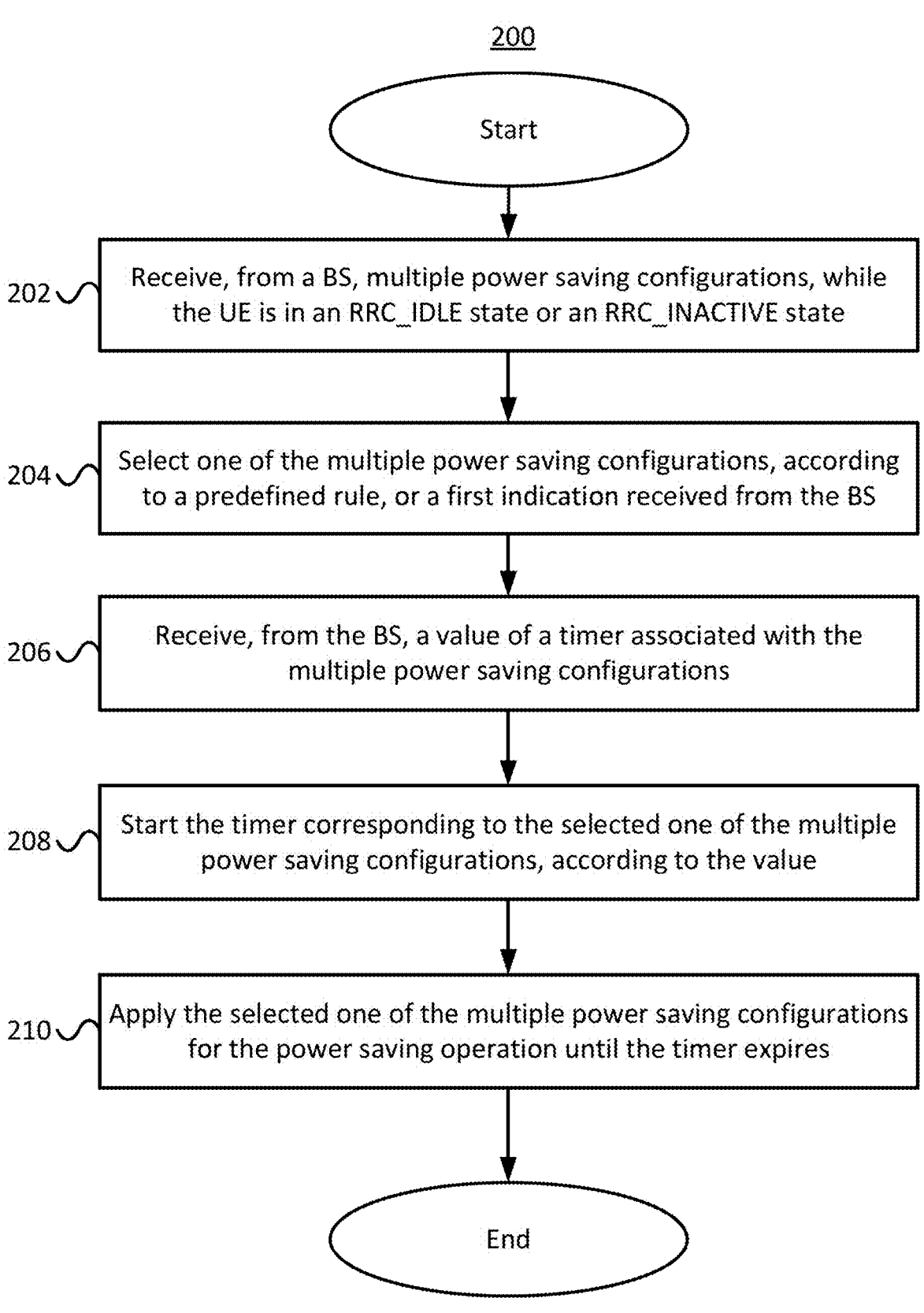
FIG. 2 is a flowchart illustrating a method/process for a UE to perform a power saving operation, according to an example implementation of the present disclosure.

FIG. 2 is a flowchart illustrating a method/process 200 for a UE to perform a power saving operation, according to an example implementation of the present disclosure. In action 202, the process 200 may start by receiving, from a BS, multiple power saving configurations, while the UE is in an RRC idle (e.g., RRC_IDLE) state or an RRC inactive (e.g., RRC_INACTIVE) state. In action 204, the process 200 may select one of the multiple power saving configurations, according to a predefined rule, or a first indication received from the BS. In action 206, the process 200 may receive, from the BS, a value of a timer associated with the multiple power saving configurations. In action 208, the process 200 may start the timer corresponding to the selected one of the multiple power saving configurations, according to the value. In action 210, the process 200 may apply the selected one of the multiple power saving configurations for the power saving operation until the timer expires. The process 200 may then end.

Figure 3:
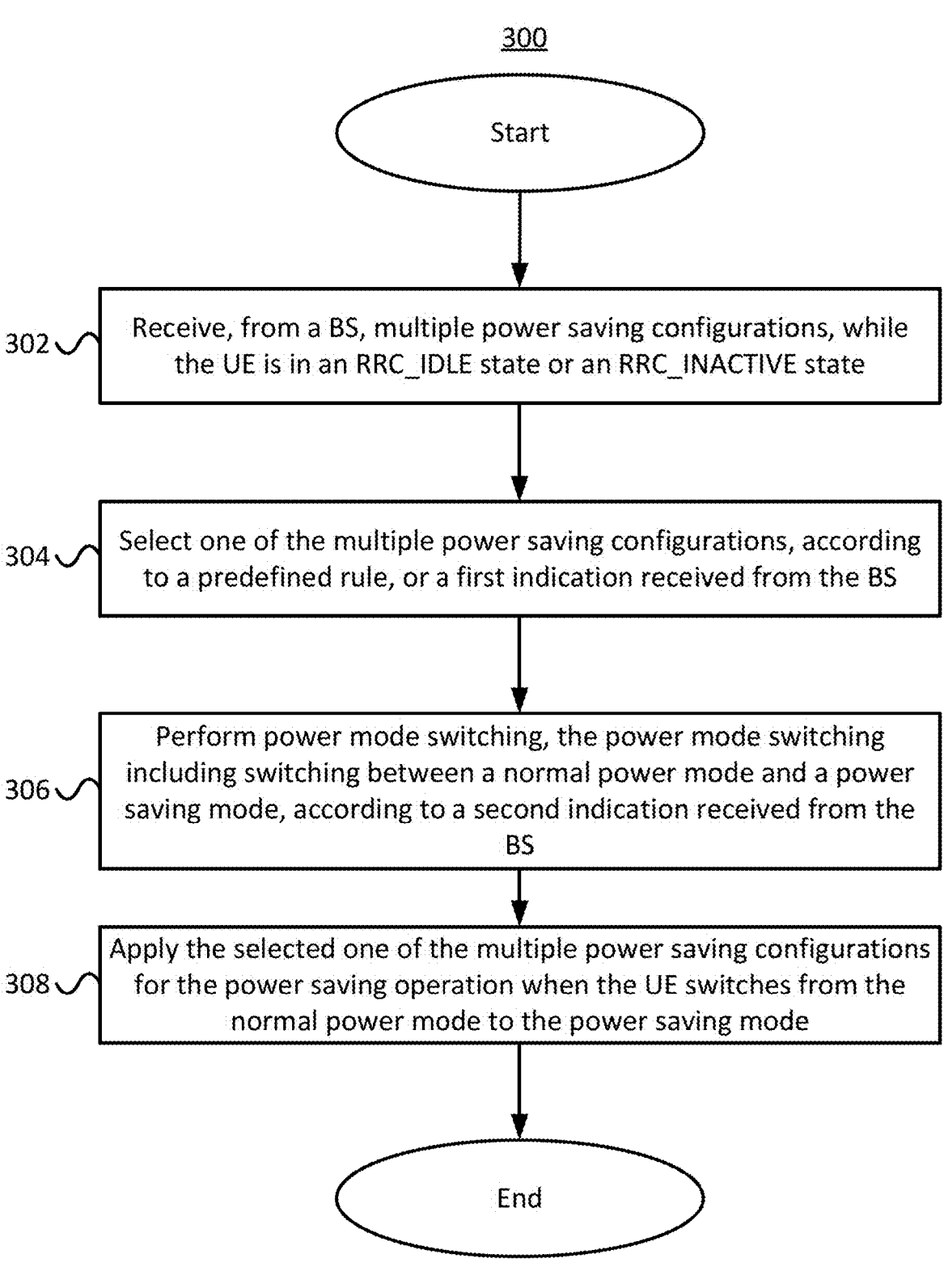
FIG. 3 is a flowchart illustrating a method/process for a UE to perform a power saving operation, according to an example implementation of the present disclosure.

FIG. 3 is a flowchart illustrating a method/process 300 for a UE to perform a power saving operation, according to an example implementation of the present disclosure. In action 302, the process 300 may start by receiving, from a BS, multiple power saving configurations, while the UE is in an RRC idle (e.g., RRC_IDLE) state or an RRC inactive (e.g., RRC_INACTIVE) state. In action 304, the process 300 may select one of the multiple power saving configurations, according to a predefined rule, or a first indication received from the BS. In action 306, the process 300 may perform power mode switching. The power mode switching may include switching between a normal power mode and a power saving mode, according to a second indication received from the BS. The second indication may be associated with at least one of a value of a timer associated with the power mode switching or a condition for the power mode switching. In action 308, the process 300 may apply the selected one of the multiple power saving configurations for the power saving operation when the UE switches from the normal power mode to the power saving mode. The process 300 may then end.

Figure 4:
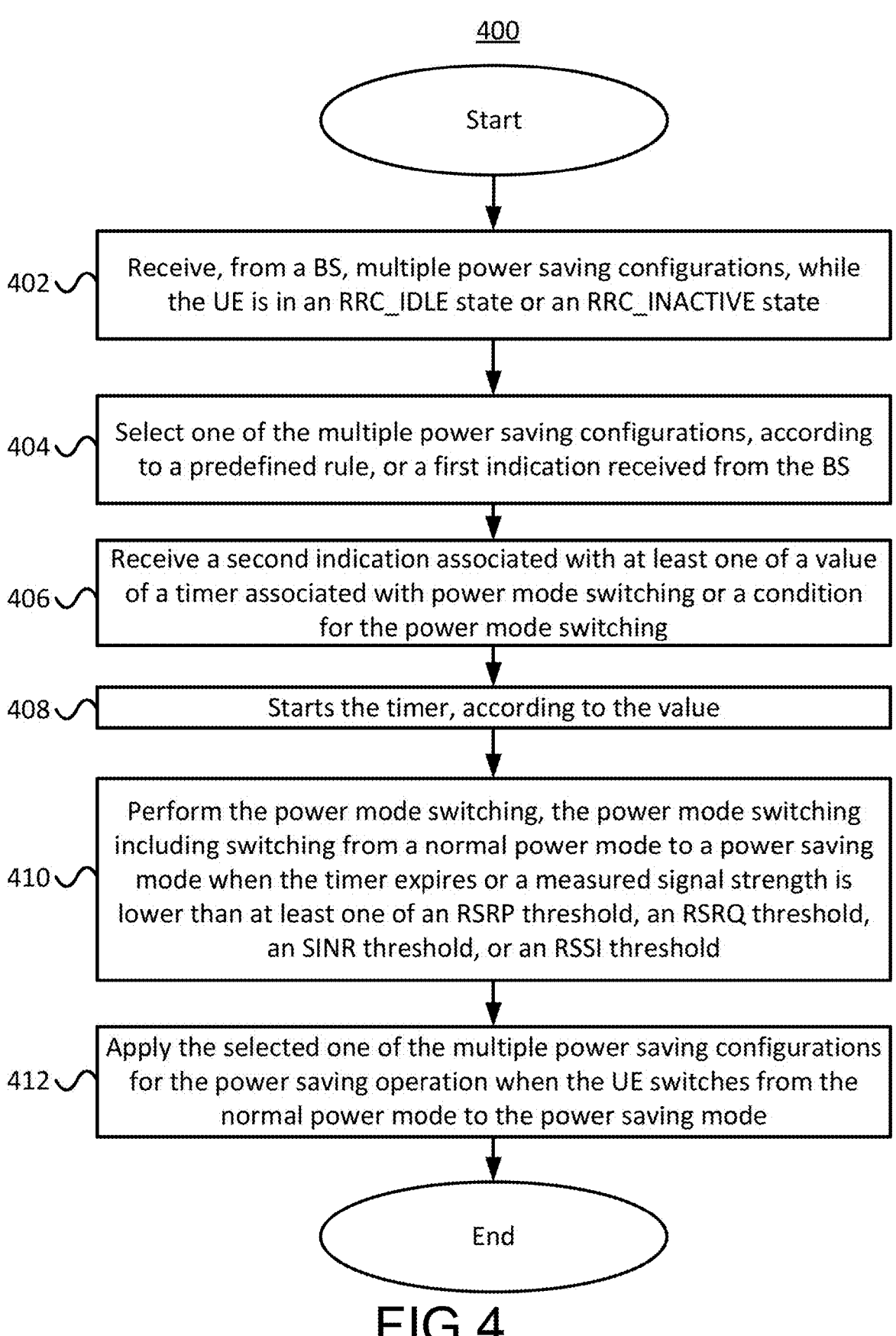
FIG. 4 is a flowchart illustrating a method/process for a UE to perform a power saving operation, according to an example implementation of the present disclosure.

FIG. 4 is a flowchart illustrating a method/process 400 for a UE to perform a power saving operation, according to an example implementation of the present disclosure. In action 402, the process 400 may start by receiving, from a BS, multiple power saving configurations, while the UE is in an RRC idle (e.g., RRC_IDLE) state or an RRC inactive (e.g., RRC_INACTIVE) state. In action 404, the process 400 may select one of the multiple power saving configurations, according to a predefined rule, or a first indication received from the BS. In action 406, the process 400 may receive a second indication associated with at least one of a value of a timer associated with power mode switching or a condition for the power mode switching. In action 408, the process 400 may start the timer, according to the value. In action 410, the process 400 may perform the power mode switching. The power mode switching may include switching from a normal power mode to a power saving mode when (i) the timer expires or (ii) a measured signal strength is lower than at least one of a Reference Signal Received Power (RSRP) threshold, a Reference Signal Received Quality (RSRQ) threshold, a Signal to Interference plus Noise Ratio (SINR) threshold, or a Received Signal Strength Indicator (RSSI) threshold. In action 412, the process 400 may apply the selected one of the multiple power saving configurations for the power saving operation when the UE switches from the normal power mode to the power saving mode. The process 400 may then end.

FIG. 5 is a flowchart illustrating a method/process 500 for a UE to perform a power saving operation, according to an example implementation of the present disclosure. In action 502, the process 500 may start by receiving, from a BS, multiple power saving configurations, while the UE is in an RRC idle (e.g., RRC_IDLE) state or an RRC inactive (e.g., RRC_INACTIVE) state. In action 504, the process 500 may select one of the multiple power saving configurations, according to a predefined rule, or a first indication received from the BS. In action 506, the process 500 may perform power mode switching. The power mode switching may include switching between a normal power mode and a power saving mode, according to a second indication received from the BS. The second indication may be associated with at least one of a value of a timer associated with the power mode switching or a condition for the power mode switching. In action 508, the process 500 may apply the selected one of the multiple power saving configurations for the power saving operation when the UE switches from the normal power mode to the power saving mode. In action 510, the process 500 may transmit, to the BS, signal that indicates that the UE is switching from the normal power mode to the power saving mode. The signal may include at least one of an RRC message, a Medium Access Control (MAC) control element (CE), or uplink control information (UCI). The process 500 may then end.

Figure 6:
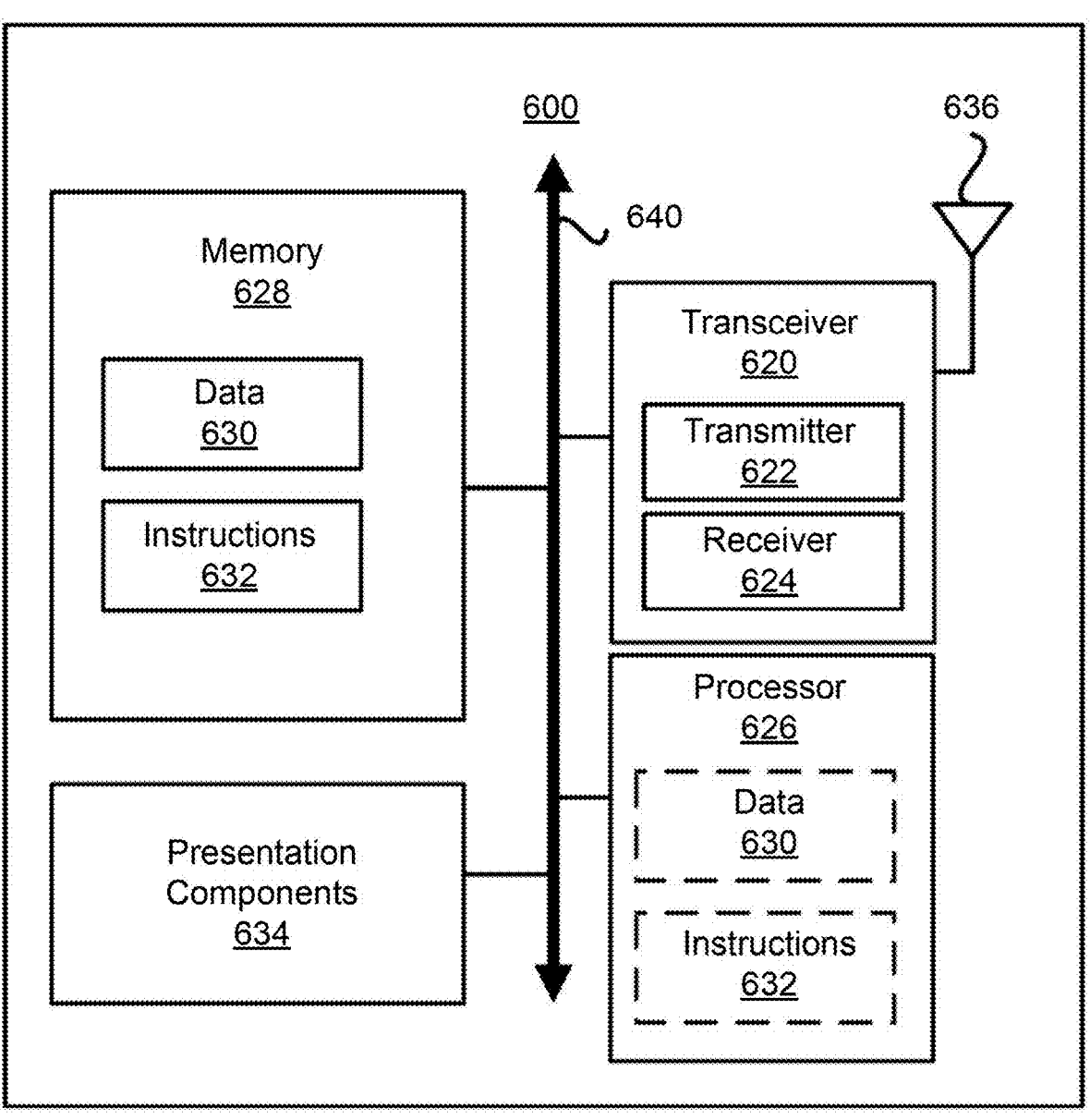
FIG. 6 is a block diagram illustrating a node for wireless communication, according to an implementation of the present disclosure.

FIG. 6 is a block diagram illustrating a node 600 for wireless communication, according to an implementation of the present disclosure.

As illustrated in FIG. 6, the node 600 may include a transceiver 620, a processor 626, a memory 628, one or more presentation components 634, and at least one antenna 636. The node 600 may also include a Radio Frequency (RF) spectrum band module, a BS communications module, a network communications module, and a system communications management module, input/output (I/O) ports, I/O components, and a power supply (not illustrated in FIG. 6).

Each of these components may be in communication with each other, directly or indirectly, over one or more buses 640. The node 600 may be a UE or a BS that performs various disclosed functions illustrated in FIG. 1 to FIG. 5 and examples in this disclosure.

The transceiver 620 may include a transmitter 622 (with transmitting circuitry) and a receiver 624 (with receiving circuitry) and may be configured to transmit and/or receive time and/or frequency resource partitioning information.

The transceiver 620 may be configured to transmit in different types of subframes and slots including, but not limited to, usable, non-usable, and flexibly usable subframes and slot formats. The transceiver 620 may be configured to receive data and control channels.

The node 600 may include a variety of computer-readable media. Computer-readable media may be any media that can be accessed by the node 600 and include both volatile (and non-volatile) media, and removable (and non-removable) media. Computer-readable media may include computer storage media and communication media. Computer storage media may include both volatile (and/or non-volatile), as well as removable (and/or non-removable), media implemented according to any method or technology for storage of information, such as computer-readable media.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal.

Communication media may typically embody computer-readable instructions, data structures, program modules, or other data in a modulated data signal, such as a carrier wave, or other transport mechanisms and include any information delivery media. The term "modulated data signal" may mean a signal that has one or more of its characteristics set or changed in such a manner as to encode information in the signal. Communication media may include wired media, such as a wired network or direct-wired connection, and wireless media, such as acoustic, RF, infrared, and other wireless media. Combinations of any of the disclosed media should be included within the scope of computer-readable media.

The memory 628 may include computer-storage media in the form of volatile and/or non-volatile memory. The memory 628 may be removable, non-removable, or a combination thereof. For example, the memory 628 may include solid-state memory, hard drives, optical-disc drives, etc. As illustrated in FIG. 6, the memory 628 may store computer-readable and/or computer-executable instructions 632 (e.g., software codes) that are configured to, when executed, cause the processor 626 (e.g., processing circuitry) to perform various disclosed functions. Alternatively, the instructions 632 may not be directly executable by the processor 626 but may be configured to cause the node 600 (e.g., when compiled and executed) to perform various disclosed functions.

The processor 626 may include an intelligent hardware device, a central processing unit (CPU), a microcontroller, an ASIC, etc. The processor 626 may include memory. The processor 626 may process the data 630 and the instructions 632 received from the memory 628, and information through the transceiver 620, the baseband communications module, and/or the network communications module. The processor 626 may also process information to be sent to the transceiver 620 for transmission via the antenna 636, to the network communications module for transmission to a CN.

One or more presentation components 634 may present data to a person or other devices. Presentation components 634 may include a display device, a speaker, a printing component, a vibrating component, etc.

From the present disclosure, it is evident that various techniques can be utilized for implementing the disclosed concepts without departing from the scope of those concepts. Moreover, while the concepts have been disclosed with specific reference to specific implementations, a person of ordinary skill in the art would recognize that changes can be made in form and detail without departing from the scope of those concepts. As such, the present disclosure is to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method of performing a power saving operation by a user equipment (UE), the method comprising:

receiving, from a base station (BS), a first power saving configuration and a second power saving configuration, while the UE is in a radio resource control (RRC) idle state or an RRC inactive state;

selecting one of the first power saving configuration or the second power saving configuration based on a rule that is predefined in the UE;

switching from a normal power mode to a power saving mode in response to determining that a measured signal strength is lower than a threshold; and applying the selected one of the first power saving configuration or the second power saving configuration for the power saving operation in response to switching from the normal power mode to the power saving mode, wherein:

the first power saving configuration includes a Discontinuous Reception (DRX) configuration including at least one DRX related parameter, and the second power saving configuration includes a non-DRX configuration including at least one of a paging related parameter or a physical downlink control channel (PDCCH) monitoring related parameter.

2. The method of claim 1, wherein the selected one of the first power saving configuration or the second power saving configuration includes a first parameter for configuring the UE to operate in the power saving mode.

3. The method of claim 2, further comprising:

receiving, from the BS, a third power saving configuration, while the UE is in an RRC connected state, wherein the third power saving configuration includes a second parameter that is different from the first parameter.

4. The method of claim 1, wherein selecting the one of the first power saving configuration or the second power saving configuration is further based on at least one of a preference of the UE, an RRC state of the UE, or a resource configuration stored in the UE or applied to the UE.

5. The method of claim 1, wherein selecting the one of the first power saving configuration or the second power saving configuration is further based on a first indication received from the BS.

6. The method of claim 1, further comprising:

receiving, from the BS, a value of a timer associated with the first power saving configuration and the second power saving configuration; and starting the timer based on the value, wherein applying the selected one of the first power saving configuration or the second power saving configuration for the power saving operation comprises applying the selected one of the first power saving configuration or the second power saving configuration until the timer expires.

7. The method of claim 1, wherein:

switching from the normal power mode to the power saving mode comprises switching from the normal power mode to the power saving mode based on a first indication received from the BS, and the first indication is associated with a value of a timer associated with a condition for switching from the normal power mode to the power saving mode.

8. The method of claim 7, further comprising:

starting the timer based on the value, wherein:

switching from the normal power mode to the power saving mode comprises switching from the normal power mode to the power saving mode when the timer expires, and the threshold comprises at least one of a Reference Signal Received Power (RSRP) threshold, a Reference Signal Received Quality (RSRQ) threshold, a Signal to Interference plus Noise Ratio (SINR) threshold, or a Received Signal Strength Indicator (RSSI) threshold.

9. The method of claim 1, further comprising:

transmitting, to the BS, a signal that indicates that the UE has switched from the normal power mode to the power saving mode.

10. The method of claim 9, wherein the signal comprises at least one of an RRC message, a Medium Access Control (MAC) control element (CE), or uplink control information (UCI).

11. A user equipment (UE) for performing a power saving operation, the UE comprising:

at least one processor; and at least one non-transitory machine-readable medium coupled to the at least one processor and storing one or more computer-executable instructions that, when executed by the at least one processor, cause the UE to:

receive, from a base station (BS), a first power saving configuration and a second power saving configuration, while the UE is in a radio resource control (RRC) idle state or an RRC inactive state;

select one of the first power saving configuration or the second power saving configuration based on a rule that is predefined in the UE;

switch from a normal power mode to a power saving mode in response to determining that a measured signal strength is lower than a threshold; and apply the selected one of the first power saving configuration or the second power saving configuration for the power saving operation in response to switching from the normal power mode to the power saving mode, wherein:

the first power saving configuration includes a Discontinuous Reception (DRX) configuration including at least one DRX related parameter, and the second power saving configuration includes a non-DRX configuration including at least one of a paging related parameter or a physical downlink control channel (PDCCH) monitoring related parameter.

12. The UE of claim 11, wherein the selected one of the first power saving configuration or the second power saving configuration includes a first parameter for configuring the UE to operate in the power saving mode.

13. The UE of claim 12, wherein the one or more computer-executable instructions, when executed by the at least one processor, further cause the UE to:

receive, from the BS, a third power saving configuration, while the UE is in an RRC connected state, wherein the third power saving configuration includes a second parameter that is different from the first parameter.

14. The UE of claim 11, wherein selecting the one of the first power saving configuration or the second power saving configuration is further based on at least one of a preference of the UE, an RRC state of the UE, or a resource configuration stored in the UE or applied to the UE.

15. The UE of claim 11, wherein selecting the one of the first power saving configuration or the second power saving configuration is further based on a first indication received from the BS.

16. The UE of claim 11, wherein the one or more computer-executable instructions, when executed by the at least one processor, further cause the UE to:

receive, from the BS, a value of a timer associated with the first power saving configuration and the second power saving configuration; and start the timer based on the value, wherein applying the selected one of the first power saving configuration or the second power saving configuration comprises applying the selected one of the first power saving configuration or the second power saving configuration until the timer expires.

17. The UE of claim 11, wherein:

switching from the normal power mode to the power saving mode comprises switching from the normal power mode to the power saving mode based on a first indication received from the BS, and the first indication is associated with a value of a timer associated with a condition for switching from the normal power mode to the power saving mode.

18. The UE of claim 17, wherein the one or more computer-executable instructions, when executed by the at least one processor, further cause the UE to:

start the timer based on the value, wherein:

switching from the normal power mode to the power saving mode comprises switching from the normal power mode to the power saving mode when the timer expires, and the threshold comprises at least one of a Reference Signal Received Power (RSRP) threshold, a Reference Signal Received Quality (RSRQ) threshold, a Signal to Interference plus Noise Ratio (SINR) threshold, or a Received Signal Strength Indicator (RSSI) threshold.

19. The UE of claim 11, wherein the one or more computer-executable instructions, when executed by the at least one processor, further cause the UE to:

transmit, to the BS, a signal that indicates that the UE has switched from the normal power mode to the power saving mode.

20. The UE of claim 19, wherein the signal comprises at least one of an RRC message, a Medium Access Control (MAC) control element (CE), or uplink control information (UCI).

* * * * *